(12) United States Patent
Kisaichi et al.

(10) Patent No.: US 8,925,500 B2
(45) Date of Patent: Jan. 6, 2015

(54) CASING STRUCTURE OF A WATER-COOLED INTERNAL COMBUSTION ENGINE

(71) Applicant: Honda Motor Co., Ltd., Tokyo (JP)

(72) Inventors: Toru Kisaichi, Asaka (JP); Jiro Ueno, Asaka (JP); Kazuya Kobayashi, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/105,830

(22) Filed: Dec. 13, 2013

(65) Prior Publication Data

US 2014/0174385 A1 Jun. 26, 2014

(30) Foreign Application Priority Data

Dec. 26, 2012 (JP) ................ 2012-282100

(51) Int. Cl.
| | |
|---|---|
| *F01P 5/10* | (2006.01) |
| *F01M 11/00* | (2006.01) |
| *F01M 1/02* | (2006.01) |
| *F01M 1/12* | (2006.01) |
| *F01M 11/02* | (2006.01) |
| *F16H 57/04* | (2010.01) |

(52) U.S. Cl.
CPC *F01P 5/10* (2013.01); *F01M 11/00* (2013.01); *F01M 1/02* (2013.01); *F01M 1/12* (2013.01); *F01M 11/0004* (2013.01); *F01M 11/02* (2013.01); *F16H 57/0413* (2013.01); *F16H 57/0475* (2013.01); *F01M 2001/0284* (2013.01); *F01M 2001/126* (2013.01); *F01M 2011/0066* (2013.01); *F01M 2011/0083* (2013.01)
USPC ............................... 123/41.44; 123/198 C

(58) Field of Classification Search
USPC ......... 123/41.33, 41.44, 195 R, 196 R, 198 C
See application file for complete search history.

(56) References Cited

U.S. PATENT DOCUMENTS

| | | | |
|---|---|---|---|
| 7,578,277 B2 | 8/2009 | Inui et al. | |
| 7,913,817 B2 | 3/2011 | Fujimoto et al. | |

FOREIGN PATENT DOCUMENTS

| | | | |
|---|---|---|---|
| CN | 201535193 U | * | 7/2010 |
| EP | 987413 A2 | * | 3/2000 |
| GB | 2351322 A | * | 12/2000 |
| JP | 2008-064079 | | 3/2008 |
| JP | 2008-082237 | | 4/2008 |

* cited by examiner

*Primary Examiner* — Noah Kamen
(74) *Attorney, Agent, or Firm* — Gregory J. Burke

(57) ABSTRACT

A casing structure of a water-cooled internal combustion engine includes a casing member defining an oil pump chamber and a water pump chamber. A rotor of an oil pump is inserted into the oil pump chamber and an impeller of a water pump is inserted into the water pump chamber. A cover member covers the casing member.

19 Claims, 14 Drawing Sheets

CASING STRUCTURE OF A WATER-COOLED INTERNAL COMBUSTION ENGINE

CROSS REFERENCE TO RELATED APPLICATIONS

The present application claims priority under 35 U.S.C. §119 to Japanese Patent Application No. 2012-282100, filed on Dec. 26, 2012, entitled "A Casing Structure of a Water-Cooled Internal Combustion Engine," the contents of which are incorporated herein by reference in their entirety.

BACKGROUND

Known internal combustion engines include an oil pump for a lubrication system located in a casing member covering a first end of a crankshaft. A water pump for a water cooling system is provided on a second end of the crankshaft. A drive shaft of the oil pump is connected coaxially with a first end of a balancer shaft rotatably installed on the crankcase and extending parallel to the crankshaft. A water pump drive shaft is connected coaxially with a second end of the balancer shaft.

Placing the oil pump and the water pump on opposite ends of the crankcase in the crankshaft direction (i.e., axial direction) in this manner requires a separate and individual casing member. This increases the number of components and leads to a desire to further improve assembly and maintainability.

SUMMARY

According to one aspect, a casing structure of a water-cooled internal combustion engine includes an oil pump (150) constituted by inserting a rotor (151) into an oil pump chamber (141) formed on a casing member (140) that covers a first end side of a crankshaft (21) supported by crankcases (22, 23), and covering the casing member (140) with a cover member (170). A water pump chamber (142) is formed on the casing member (140) and an impeller (161) of a water pump (160) is inserted into the water pump chamber (142). Arranged in this manner, the oil pump (150) and the water pump (160) may be constituted by the common casing member (140) and the common cover member (170) which may reduce the number of components and improve assembly and maintainability by using members in common.

According to one embodiment, the casing member (140) is sandwiched between the cover member (170) and the crankcases (22, 23) by respective contact with mated surfaces on both sides orthogonal to the crankshaft (21). The oil pump chamber (141) and the water pump chamber (142) are formed in nearly the same position in the crankshaft direction. Arranged in this manner, the oil pump (150) and the water pump (160) may be installed compactly in the crankshaft direction, enabling a reduction in size of the internal combustion engine.

According to one embodiment, the casing member (140) includes a vertically long oil tank chamber (143) extending in a substantially vertical direction through a position that overlaps with the crankshaft (21) as viewed in a crankshaft direction. The oil pump chamber (141) and the water pump chamber (142) are located on opposite sides of the oil tank chamber (143). Arranged in this manner, the oil pump chamber (141), the water pump chamber (142), and the oil tank chamber (143) may be intensively placed in the periphery of the crankshaft (21) as viewed in the crankshaft direction, thereby enabling reduction in size of the internal combustion engine (E), oil stored in the oil tank chamber (143) is easily cooled by the coolant circulated by the water pump (160), thereby increasing cooling efficiency of the internal combustion engine (E). Further, when starting the internal combustion engine (E), the temperature of the oil may be increased using the temperature of the coolant to facilitate engine warm-up. Additionally, because the oil tank chamber (143) extends vertically, the gas-liquid separation performance of the oil is easily secured.

According to one embodiment, the casing member (140) includes a coolant passage (W1) extending upwardly along the oil tank chamber (143) from the water pump chamber (142), and a clutch case portion (144) that covers a perimeter of the clutch (30) is formed integrally on a side of the casing member opposite the coolant passage (W1). Arranged in this manner, the coolant passage (W1) that guides the coolant from the water pump (160) to the upward cylinder (23c) and the cylinder head (24) may be easily formed without interference by the clutch case portion (144) to thereby simplify the piping structure. Further, because the clutch case portion (144) is formed integrally on the casing member (140), reduction in the number of parts improves assembly and maintainability.

According to one embodiment, the casing member (140) includes an oil passage (A5) for supplying oil to the oil tank chamber (143) formed along the coolant passage (W1) between the coolant passage (W1) and the oil tank chamber (143). Arranged in this manner, the oil that flows in the oil passage (A5) is effectively cooled by the coolant flowing in the coolant passage (W1) and is supplied to the oil tank chamber (143) to thereby improve the cooling efficiency of the internal combustion engine (E).

According to one embodiment, the cover member (170) includes base portions (172, 173) for attaching an oil filter (156) and an oil cooler (200). Arranged in this manner, the structure may be simplified and assembly and maintainability may be improved by combined use of members.

According to one embodiment, the cover member (170) includes a base portion (172) for oil filter (156) located near a lower side portion of the oil pump chamber (141), and a base portion (173) for oil cooler (200) in a position that corresponds to an upper side portion of the oil tank chamber (143). Arranged in this manner, the oil cooler (200) and the oil filter (156) may be separately placed above and below the cover member (170) and size increase of the internal combustion engine (E) due to space for accessories may be prevented, the degree of freedom in design of cooling and lubrication structure is enhanced, and efficiency of cooling and lubrication performance may be improved.

According to one embodiment, the casing member (140) is formed of an aluminum alloy material having favorable thermal conductivity. As a result, the oil circulated by the oil pump (150) may be effectively cooled by the coolant circulated by the water pump (160), thereby increasing the cooling efficiency of the internal combustion engine (E). Further, when starting the internal combustion engine (E), the temperature of the oil may be raised quickly using the water temperature of the coolant to facilitate engine warm-up.

DETAILED DESCRIPTION

An embodiment will be described below based on FIGS. 1 to 16. A power unit P includes an internal combustion engine E and a power transmission device 20. The power transmission device 20 includes a main transmission Tm and secondary transmission Ts. The power unit P is installed in a four-wheel-drive five passenger roofed off-road vehicle 1.

Figure 1:
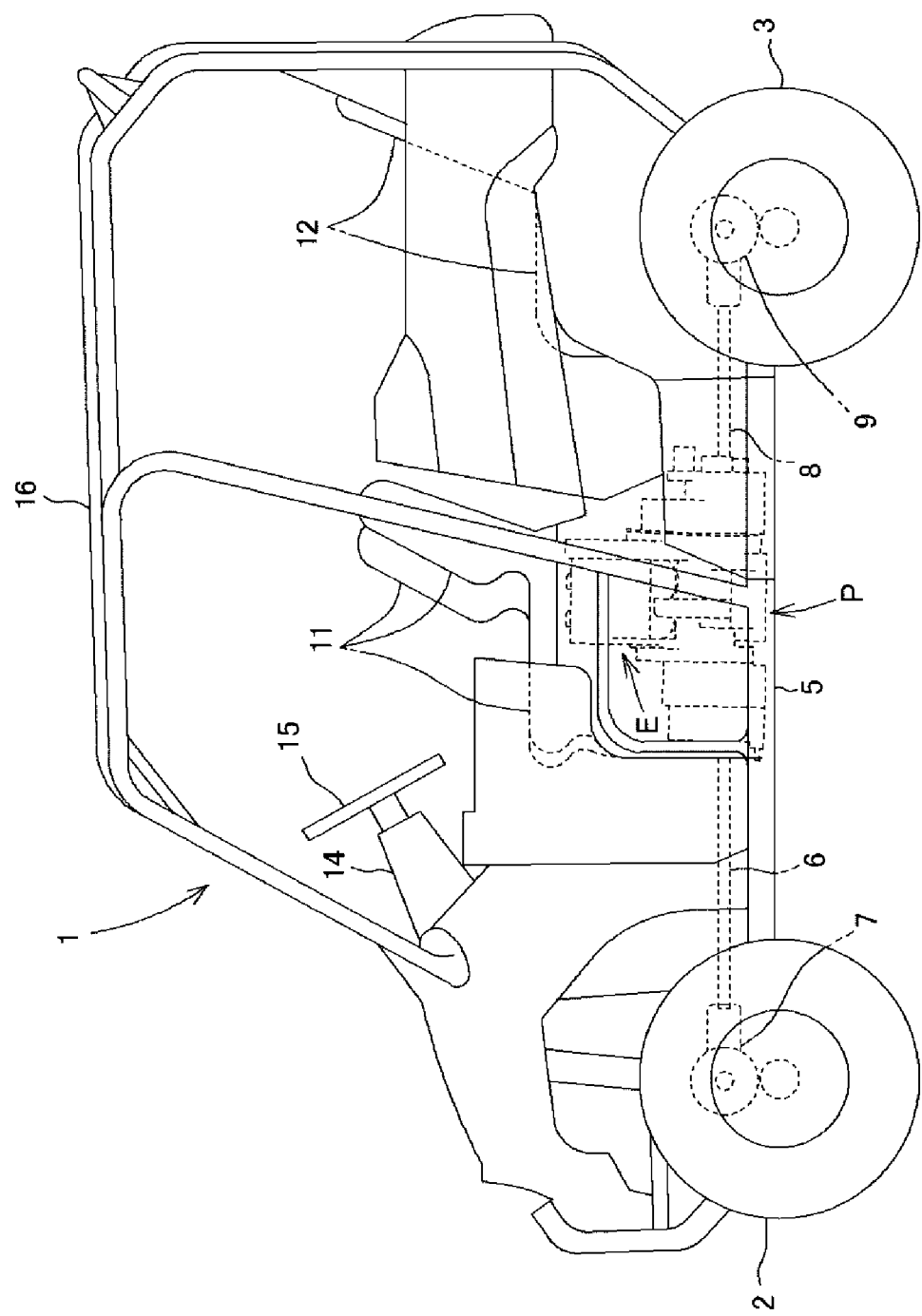
FIG. 1 is a side view of an off-road vehicle equipped with a power unit that incorporates an internal combustion engine according to an embodiment.
Figure 2:
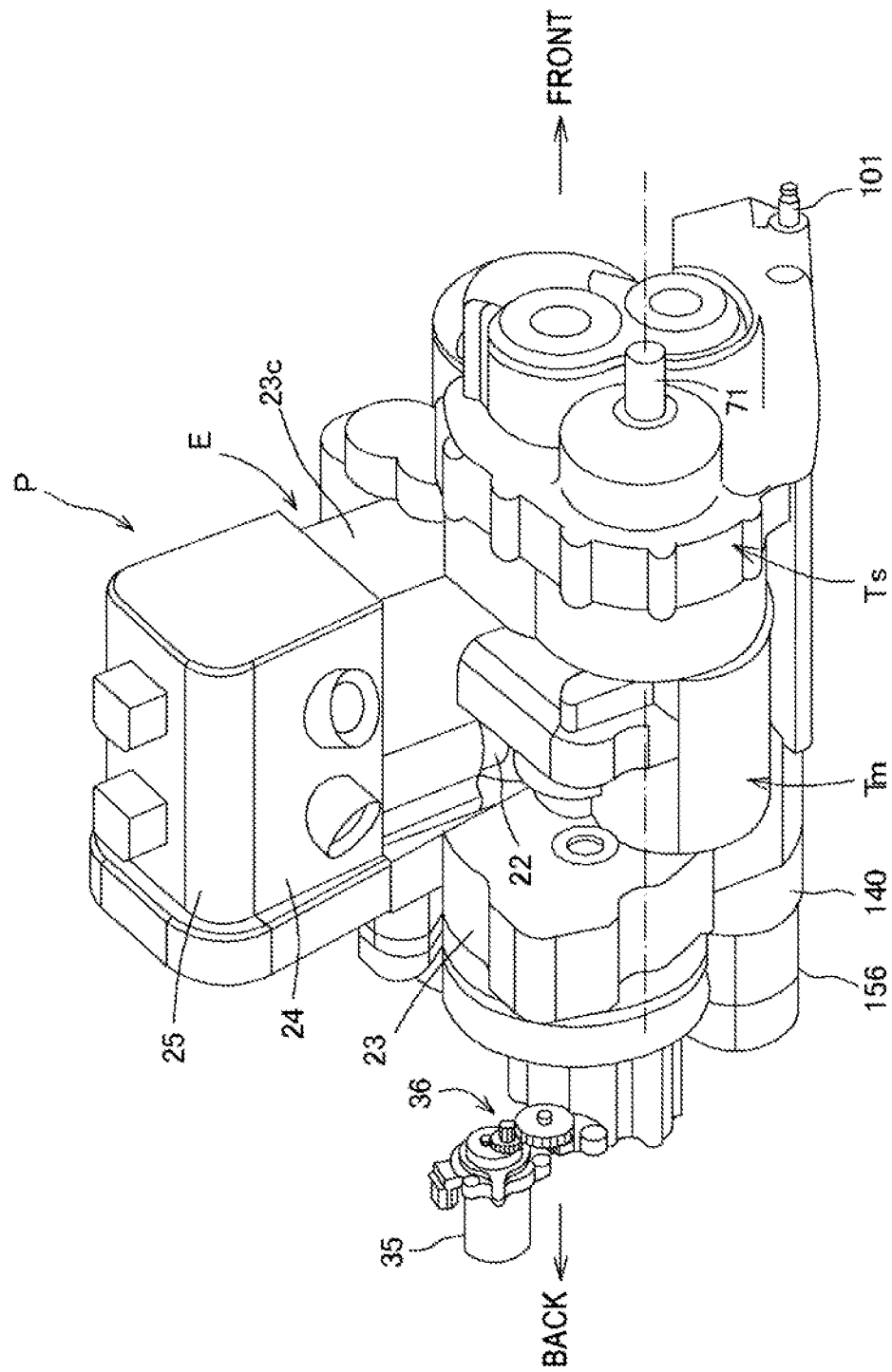
FIG. 2 is a perspective view of the power unit.

With reference to FIG. 1, the off-road vehicle 1 has left and right respective pairs of front wheels 2, 2 and rear wheels 3, 3 mounted with low pressure balloon tires for off-road use suspended on the front and rear of a vehicle frame 5. The power unit P is installed in a front to back orientation in a central position of the vehicle frame 5 to direct the crankshaft 21 of the internal combustion engine E in a front and back direction. An output shaft 71 of the power unit P protrudes from the secondary transmission Ts at front and back ends of the shaft (see FIGS. 2 and 5). The rotary power of the output shaft 71 is transferred to the left and right front wheels 2, 2 from the front end of the output shaft 71 via a front drive shaft 6 and a front final reduction gear unit 7. The rotary power of the output shaft 71 is transferred to the left and right rear wheels 3, 3 from the back end via a rear drive shaft 8 and a rear final reduction gear unit 9. A clutch for switching between two-wheel drive and four-wheel drive by disengaging the power transmission to the front wheels can be incorporated into the front final reduction gear unit 7.

A front row of seats 11 includes 3 seats arranged left and right above the power unit P. The seat in the center of the front row of seats 11 is out to the front slightly more than the seats on the left and the right. A rear row of seats 12 includes 2 seats arranged left and right in the rear part of the vehicle frame 5. A steering wheel 15 protrudes from a steering column 14 in front of a left side driver seat. A roof 16 covers the front seat 11 and the rear seat 12.

The internal combustion engine E is an in-line two-cylinder, water-cooled, four-stroke internal combustion engine, and the power unit P is installed in the vehicle frame 5 in what is known as a vertically placed attitude by directing the crankshaft 21 of the internal combustion engine E in a front and back direction of the vehicle body.

The crankcase that supports the crankshaft 21 of the internal combustion engine E forms an upper/lower divided crankcase structure including an upper crankcase 23 and a lower crankcase 22. The upper crankcase 23 has a cylinder portion 23c extending obliquely to the upper right, and on this, a cylinder head 24 and a cylinder head cover 25 are sequentially, and protrudingly, overlaid (see FIG. 2, FIG. 3, and FIG. 7). The crankcases 22 and 23 accommodate the main transmission Tm that protrudes to the right. The main transmission Tm is positioned to the right side of the crankshaft 21 of the internal combustion engine E, and a secondary transmission Ts is installed so as to mostly overlap in the front of the main transmission Tm.

Figure 5:
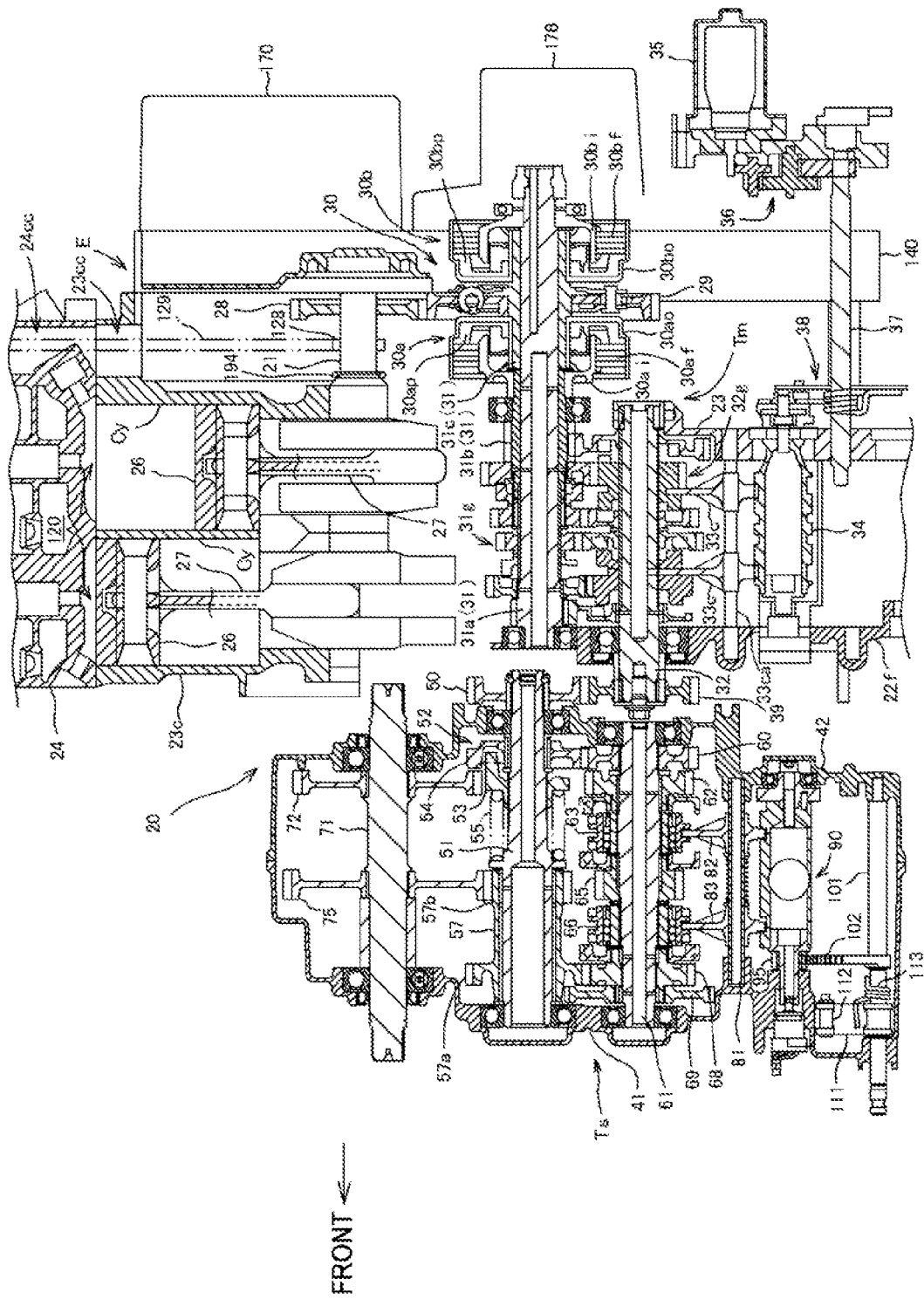
FIG. 5 is a cross-sectional view illustrating a power transmission system of the power unit.

The power transmission device 20 is illustrated in the cross-sectional view of FIG. 5. Two cylinders Cy and Cy are formed in front and rear series on the cylinder portion 23c of the upper crankcase 23 of the internal combustion engine E, and a connecting rod 27 connects the crankshaft 21 and a piston 26. The piston reciprocally slides within each cylinder Cy, whereby the reciprocal movement of the piston 26 is converted to rotation of the crankshaft 21 and is output. Within a backside portion of the crankshaft 21, sequentially, a primary drive gear 28 is fitted to a back end portion of the crankshaft, a drive sprocket 128 is fitted to the crankshaft forwardly of the primary drive gear 28 and a drive sprocket 194 is fitted to the crankshaft forwardly of the drive sprocket 128.

Figure 7:
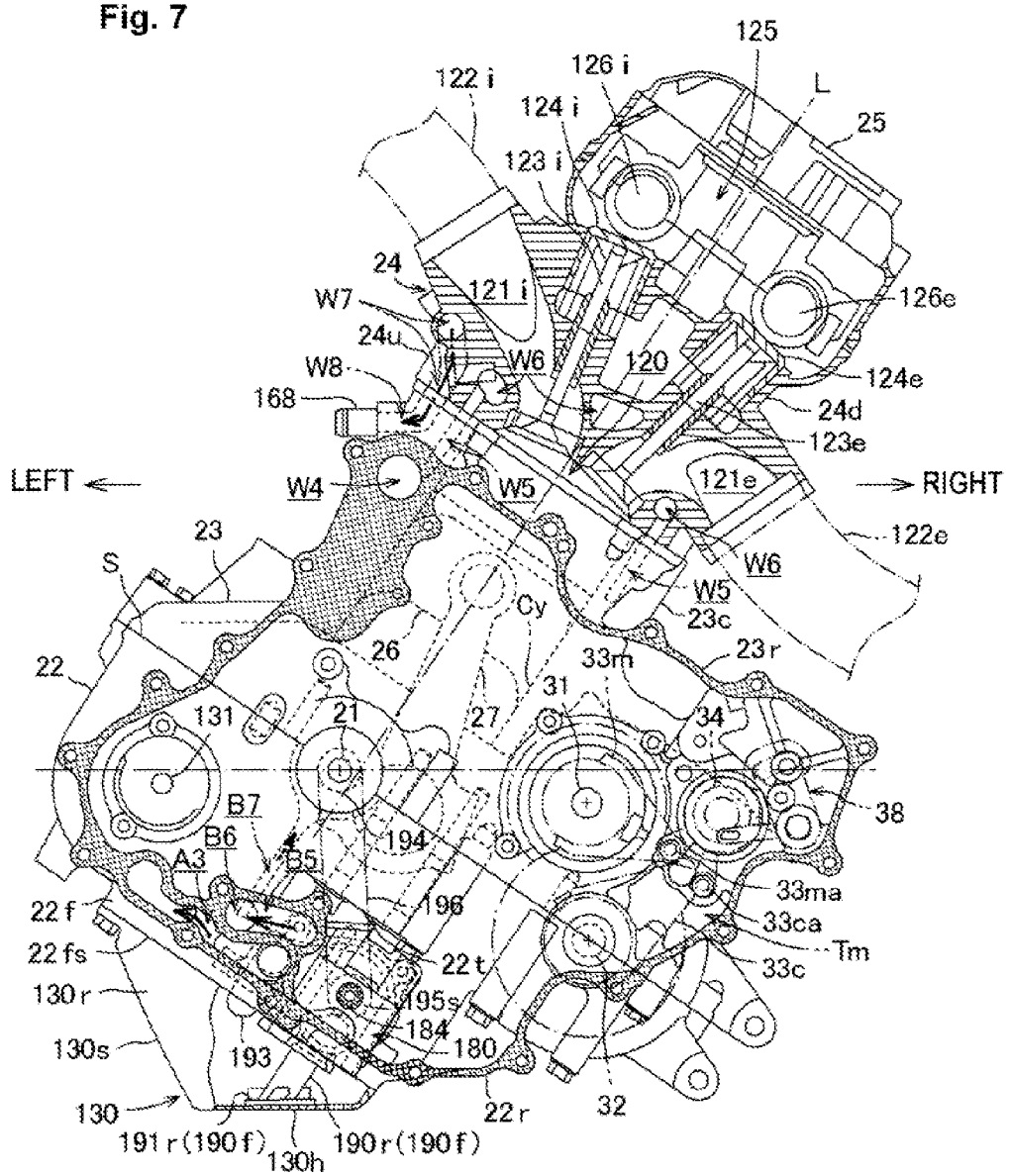
FIG. 7 is a rear view as a partial cross-section of the power unit in which structure including a casing member has been removed.

With reference to FIG. 7, a rear view of the internal combustion engine E is shown. When the internal combustion engine E is an a horizontal attitude with the vehicle, the right side of the dividing surface S between the upper crankcase 23 and lower crankcase 22 is inclined downwardly. The main transmission Tm includes a main shaft 31 and a counter shaft 32. As shown, the crankshaft 21 and the counter shaft 32 are placed on the inclined dividing surface S. The crankshaft 21 and the counter shaft 32 are sandwiched by the upper crankcase 23 and the lower crankcase 22 and are rotatably supported. The main shaft 31 is located above the counter shaft 32 and is rotatably supported by the upper crankcase 23.

The main shaft 31, which is positioned above the counter shaft 32, is positioned slightly lower than the crankshaft 21. Specifically, the dividing surface S of the upper crankcase 23 and the lower crankcase 22 is significantly inclined to the extent that the main shaft 31, which is positioned above the counter shaft 32, is positioned lower than the crankshaft 21. The cylinder portion 23c of the upper crankcase 23 extends obliquely upward to the right so that the cylinder axial line L is orthogonal to the inclined dividing surface S. The cylinder portion 23c, as illustrated in FIG. 7, is an offset cylinder in which the cylinder axial line L is offset from the crankshaft 21 towards the main transmission Tm side.

With reference to FIG. 5, the main shaft 31 of the main transmission Tm is configured such that a clutch portion outer cylinder 31c and a main shaft outer cylinder 31b are rotatably fit side-by-side on an outer periphery of a long main shaft inner cylinder 31a. Six drive transmission gears 31g are provided on the main shaft 31. Six driven transmission gears 32g, which are constantly meshed with the drive transmission gears 31g, are provided on the counter shaft 32. The drive transmission gears 31g for the odd numbered shift stages are provided on the main shaft inner cylinder 31a, and the drive transmission gears 31g for the even numbered shift stages are provided on the main shaft outer cylinder 31b.

A pair of twin clutches 30 including a first clutch 30a and a second clutch 30b is configured on the clutch portion outer cylinder 31c. A primary driven gear 29 is provided in the center of the clutch portion outer cylinder 31c and, on both sides thereof, clutch outers 30ao and 30bo of the first clutch 30a and the second clutch 30b are spline fitted for axial movement. The center primary driven gear 29 meshes with the primary drive gear 28 provided on the crankshaft 21.

Further, a clutch inner 30ai of the first clutch 30a is spline fit to the main shaft inner cylinder 31a for axial movement, and a clutch inner 30bi of the second clutch 30b is spline fit to the main shaft outer cylinder 31b for axial movement. Pressure plates 30ap (30bp) can pressurize friction plate groups 30af (30bf) in which a drive friction plate that rotates together on the clutch outer 30ao (30bo) side and a driven friction plate that rotates together on the clutch inner 30ai (30bi) side are arrayed alternately.

A hydraulic circuit that selectively drives the pressure plates 30ap and 30bp is formed on the main shaft inner cylinder 31a, the clutch portion outer cylinder 31c, and a clutch cover 178. When the friction plate group 30af is pressurized by the pressure plate 30ap, the first clutch 30a engages, power input to the primary driven gear 29 is transferred to the main shaft inner cylinder 31a, and the drive transmission gears 31g for the odd numbered shift stages rotate. When the friction plate group 30bf is pressurized by the pressure plate 30bp, the second clutch 30b engages, power input to the primary driven gear 29 is transferred to the main shaft outer cylinder 31b, and the drive transmission gears 31g for the even numbered shift stages rotate.

Two of the six drive transmission gears 31g are shifter gears that slide in the axial direction, and two of the six driven transmission gears 32g are shifter gears that slide in the axial direction. Shift forks 33c and 33c that move the two shifter gears on the counter shaft 32 are supported on a shift fork shaft 33ca. Similarly, as illustrated in FIG. 7, shift forks 33m and 33m that move the two shifter gears on the main shaft 31 are supported on a shift fork shaft 33ma.

The four shift forks 33m and 33c shift gears by moving, according to the rotation of a shift drum 34, guided by a guide groove formed on an outer peripheral surface of the shift drum 34. The shift drum 34 rotates according to a shifting motor 35. The driving force of the shifting motor 35 is transferred to rotation of a shift spindle 37 via a speed reduction gear mechanism 36. The rotation of the shift spindle 37 is transferred to rotation of the shift drum 34 via an intermittent feeding mechanism 38.

Therefore, the main transmission Tm can change speed by smoothly shifting gears from first gear to sixth gear by hydraulic control of the twin clutch 30 and by drive control of the shifting motor 35. The output shaft of the main transmission Tm is the counter shaft 32 passing through a front side wall of the crankcases 22 and 23. A main transmission output gear 39 is fitted onto the protruding front end of the counter shaft.

The power unit P provides a secondary transmission Ts located in front of the main transmission Tm. The secondary transmission Ts is configured internally of a combined front secondary transmission case 41 and a rear secondary transmission case 42. The secondary transmission Ts is provided with a cam type torque damper 52.

A transmission drive shaft 61, a transmission driven shaft 71 (also referred to as the "output shaft"), and other rotating shafts such as a damper shaft 51 that supports a cam type torque damper 52, are parallel to the crankshaft 21 (i.e., directed in the front and back direction). The front and the back ends of these shafts are constructed to be respectively supported by the front secondary transmission case 41 and the rear secondary transmission case 42.

The damper shaft 51 corresponds to the input shaft of the secondary transmission Ts. A secondary transmission input gear 50 is fitted to an end portion of the damper shaft protruding rearwardly of the rear secondary transmission case 42. The secondary transmission input gear 50 meshes with the main transmission output gear 39, and the output of the main transmission Tm is input into the secondary transmission input gear 50 of the secondary transmission Ts. The cam type torque damper 52 is provided on the rear half portion of the damper shaft 51. Specifically, a cam member 53 on the rear half portion of the damper shaft 51 is spline fit for axial movement. A cam follower gear member 54 that faces rearwardly of the cam member 53 is supported with relative rotational ability on the damper shaft 51 and with regulated travel in the axial direction. Cam member 53 is biased toward the cam follower gear member 54 by a coil spring 55. The cam type torque damper 52 is configured so that a protruding cam surface of the cam member 53 contacts a recess of the cam follower gear member 54.

Accordingly, even if the torque input to the damper shaft 51 from the secondary transmission input gear 50 suddenly increases or decreases, a buffering action works between the cam member 53 and the cam follower gear member 54. The buffering action suppresses the effects on the transmission mechanism on the downstream side of the cam follower gear member 54 to facilitate a smooth shift change.

An intermediate cylindrical gear member 57 is rotatably supported on a front damper shaft 51f with free relative rotation. A large idle gear 57a and a small idle gear 57b are integrally formed on the front and back of the intermediate cylindrical gear member 57.

Within the secondary transmission Ts, the transmission drive shaft 61 extends parallel to the output shaft 71 in the same axial position below the damper shaft 51. A drive shaft input gear 60 is spline fit in a fixed position on a rear part of the transmission drive shaft 61 and meshes with the cam follower gear member 54, and the motive power via the cam type torque damper 52 is input into the transmission drive shaft 61.

On a rear portion of the transmission drive shaft 61, a high speed drive gear 62 is rotatably supported adjacent a front side of the drive shaft input gear 60. A low speed drive gear 65 and a reverse drive gear 68 are rotatably supported in a center portion and a rear portion, respectively, of the transmission drive shaft 61. A high and low speed switching clutch mechanism, including a high and low speed switching shifter member 63, is provided between the high speed drive gear 62 and the low speed drive gear 65.

Moving the high and low speed switching shifter member 63 rearwardly engages the high speed drive gear 62 to rotate the high speed drive gear 62 together with the transmission drive shaft 61. Moving the high and low speed switching shifter member 63 forwardly engages the low speed drive gear 65 to rotate the low speed drive gear 65 together with the transmission drive shaft 61. When the high and low speed switching shifter member 63 is positioned in the center so as not to engage either gear, the rotation of the transmission drive shaft 61 is not transferred to either the high speed drive gear 62 or the low speed drive gear 65.

A forward and reverse switching clutch mechanism, including a forward and reverse switching shifter member 66, is provided between the low speed drive gear 65 and the reverse drive gear 68. If the forward and reverse switching shifter member 66 is positioned rearwardly, there is no counterpart to engage. The rotation of the transmission drive shaft 61 is transferred only to the high speed drive gear 62 or the low speed drive gear 65 via the high and low speed switching shifter member 63 and is not transferred via the forward and reverse switching shifter member 66. Moving the forward and reverse switching shifter member 66 forwardly engages the reverse drive gear 68 to rotate the reverse drive gear 68 together with the transmission drive shaft 61.

The reverse drive gear 68 meshes with the large idle gear 57a of the intermediate cylindrical gear member 57. Further, a parking gear 69 adjacent to the front of the reverse drive gear 68 is provided on the transmission drive shaft 61 by being fitted to the reverse drive gear 68.

The transmission driven shaft 71 (i.e., the "output shaft") is installed parallel to the transmission drive shaft 61 to the right of the transmission drive shaft 61 with the damper shaft 51 installed above the transmission drive shaft 61. A high speed driven gear 72 is spline fit to transmission driven shaft 71 in a fixed position on a rear portion of the transmission driven shaft. A low speed driven gear 75 is spline fit in a central fixed position of the transmission driven shaft 71. Therefore, the high speed driven gear 72 and the low speed driven gear 75 integrally rotate with the transmission driven shaft 71 in a predetermined axial position.

The high speed driven gear 72 and the low speed driven gear 75 always mesh respectively with the high speed drive gear 62 and the low speed drive gear 65. Further, the low speed driven gear 75 also meshes with the small idle gear 57b of the intermediate cylindrical gear member 57. Therefore, the rotation of the reverse drive gear 68 on the transmission drive shaft 61, via the large idle gear 57a and the small idle gear 57b of the intermediate cylindrical gear member 57 on the damper shaft 51, makes the rotational direction a reverse direction and transfers to the low speed driven gear 75 to thereby rotate the transmission driven shaft 71 in the reverse direction.

The transmission driven shaft 71 is an output shaft of the secondary transmission Ts having front and back ends respectively protruding from the front secondary transmission case 41 and the rear secondary transmission case 42 of the secondary transmission Ts. In other words, the front end of the transmission driven shaft (output shaft) 71 is coupled to the front drive shaft 6, and the back end of the transmission driven shaft 71 is coupled to the rear drive shaft 8, to transfer motive power to the front wheels 2, 2 and the rear wheels 3, 3.

A transmission drive mechanism 80 that moves the high and low speed switching shifter member 63 on the transmission drive shaft 61 and the forward and reverse switching shifter member 66 in the axial direction is provided on the left side of the transmission drive shaft 61 (right side in FIG. 3) (i.e., on the crankshaft 21 side). A shift fork shaft 81 has front and back ends respectively supported by the front secondary transmission case 41 and the rear secondary transmission case 42. Shift forks 82, 83 are supported on the shift fork shaft 81 for receipt in shift fork grooves of the high and low speed switching shifter member 63 and the forward and reverse switching shifter member 66, respectively.

Figure 3:
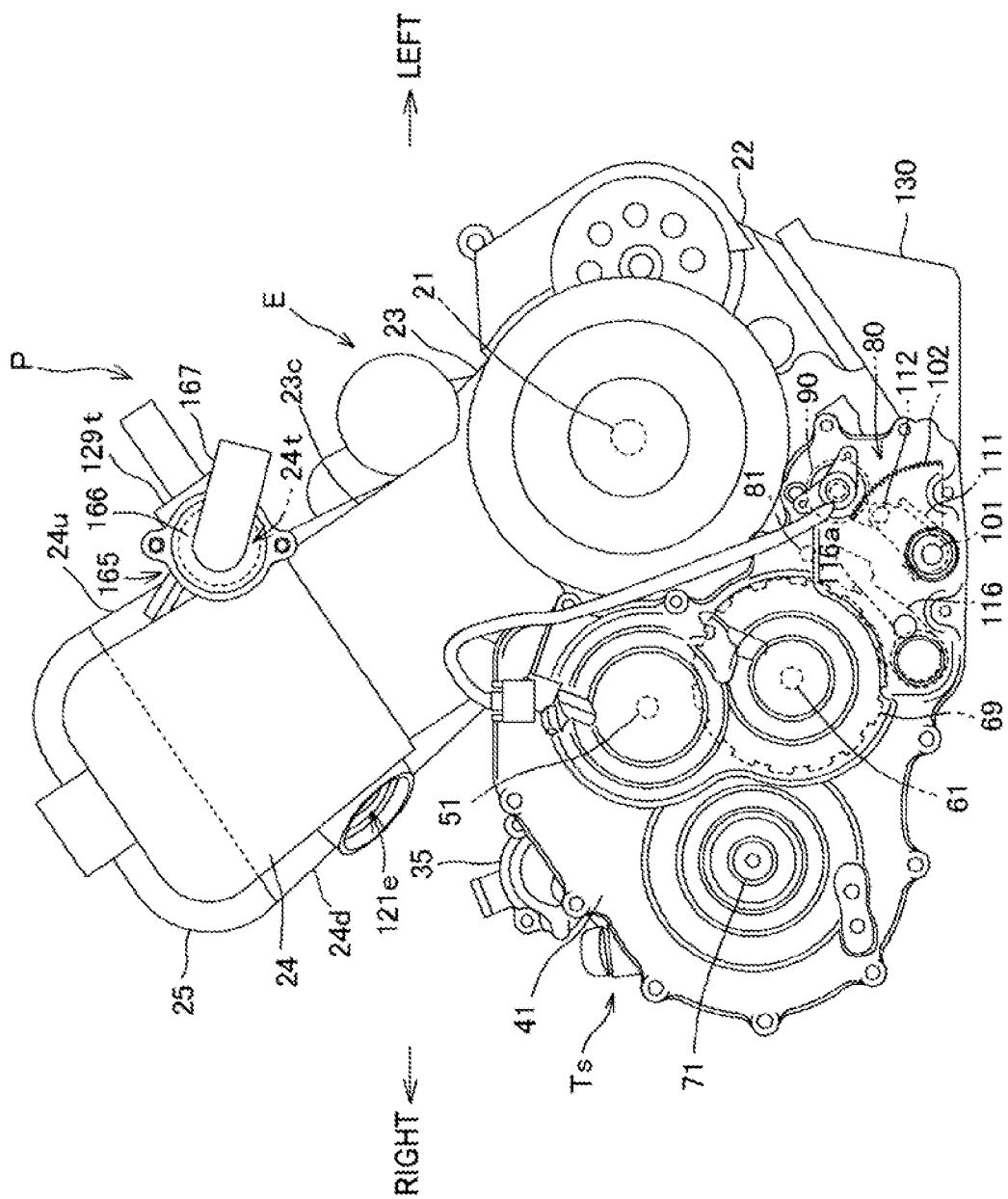
FIG. 3 is a front view of the power unit.

A shift drum 90 is provided further to the left of the shift fork shaft 81 (see FIG. 3). Two guide grooves 91f, 91r having required shapes in the circumferential direction are provided in the front and back on an outer peripheral surface of the shift drum 90. Engagement pin portions of the shift forks 82 and 83 are slidingly engaged the guide grooves 91f and 91r. The shift forks 82 and 83 are respectively guided in the guide grooves by the rotation of the shift drum 90 to travel in the axial direction and move the high and low speed switching shifter member 63 and the forward and reverse switching shifter member 66 to perform a shift change.

With reference to FIG. 3 and FIG. 5, a shift spindle 101 located below the shift fork shaft 81 is rotatably supported with a front end passing through a shaft hole 48fh of the front secondary transmission case 41 and a back end fitting into a shaft hole of rear secondary transmission case 42. The shift spindle 101 rotates by the action of a manual shifting operation applied to the front end of the shift spindle 101. A gearshift arm 102 in a fan shape is fitted in a predetermined position of the shift spindle 101. The gearshift arm 102 meshes with a shift drum input gear 95 fitted on a drum support shaft 92 of the shift drum 90.

Further, a parking operation arm 111 is pivotably supported by the shift spindle 101. Rotation of the shift spindle 101 is transferred to pivoting of the parking operation arm 111 via a torsion spring 113, which is mounted between the shift spindle 101 and the parking operation arm 111. A roller 112 is rotatably supported on the tip of the parking operation arm 111.

A parking lock lever 116 is pivotably supported below the transmission drive shaft 61 on the right side of the shift spindle 101 (see FIG. 3). A locking protuberance 116a that locks in a groove between the teeth of the parking gear 69 is formed on the parking lock lever 116. When the parking operation arm 111 pivots by the rotation of the shift spindle 101, and the roller 112 on the tip of the parking operation arm 111 abuts the parking lock lever 116 and rolls, the parking lock lever 116 pivots and the locking protuberance 116a engages in a groove between the teeth of the parking gear 69 to lock the parking gear 69 and prohibit rotation.

With reference to FIG. 7, there is shown a rear view of the internal combustion engine E after components including a casing member 140 on the back side of the internal combustion engine E are removed to expose the crankcases 22 and 23. When the internal combustion engine E has a horizontal attitude with the vehicle, the right side of the dividing surface S of the vertically split upper crankcase 23 and lower crankcase 22 inclines downwardly. The cylinder portion 23c of the upper crankcase 23 is formed so that the cylinder axial line L of the cylinder Cy is orthogonal to the inclined dividing surface S (i.e., oblique to horizontal). The cylinder head 24 is overlaid onto the cylinder portion 23c on a mated surface that is parallel to the dividing surface S of the cylinder portion 23c.

The obliquely inclined cylinder head 24 has an intake port 121i for each cylinder that extends upwardly by curving from a combustion chamber 120 formed between a top surface of the piston 26. The cylinder head 24 includes an exhaust port 121e for each cylinder that extends downwardly by curving from the combustion chamber 120. The intake port 121i opens to an upper side surface 24u facing obliquely upward of the cylinder head 24. The exhaust port 121e opens to a lower side surface 24d facing obliquely downward of the cylinder head 24 (see FIG. 7). An intake pipe 122i is connected to the opening of the intake port 121i and an exhaust pipe 122e is connected to the opening of the exhaust port 121e.

The combustion chamber side opening of the intake port 121i is opened and closed by an intake valve 123i and the combustion chamber side opening of the exhaust port 121e is opened and closed by an exhaust valve 123e. A valve mechanism 125 including an intake camshaft 126i and an exhaust camshaft 126e directed parallel to the crankshaft 21 is provided above the cylinder head 24. An intake cam of the intake camshaft 126i contacts a valve lifter 124i on an upper end of the intake valve 123i and an exhaust cam of the exhaust camshaft 126e contacts a valve lifter 124e on an upper end of the exhaust valve 123e. The intake cam and the exhaust cam move the intake valve 123i and the exhaust valve 123e by the rotation of the intake camshaft 126i and the exhaust camshaft 126e to open the valves (see FIG. 7).

Figure 15:
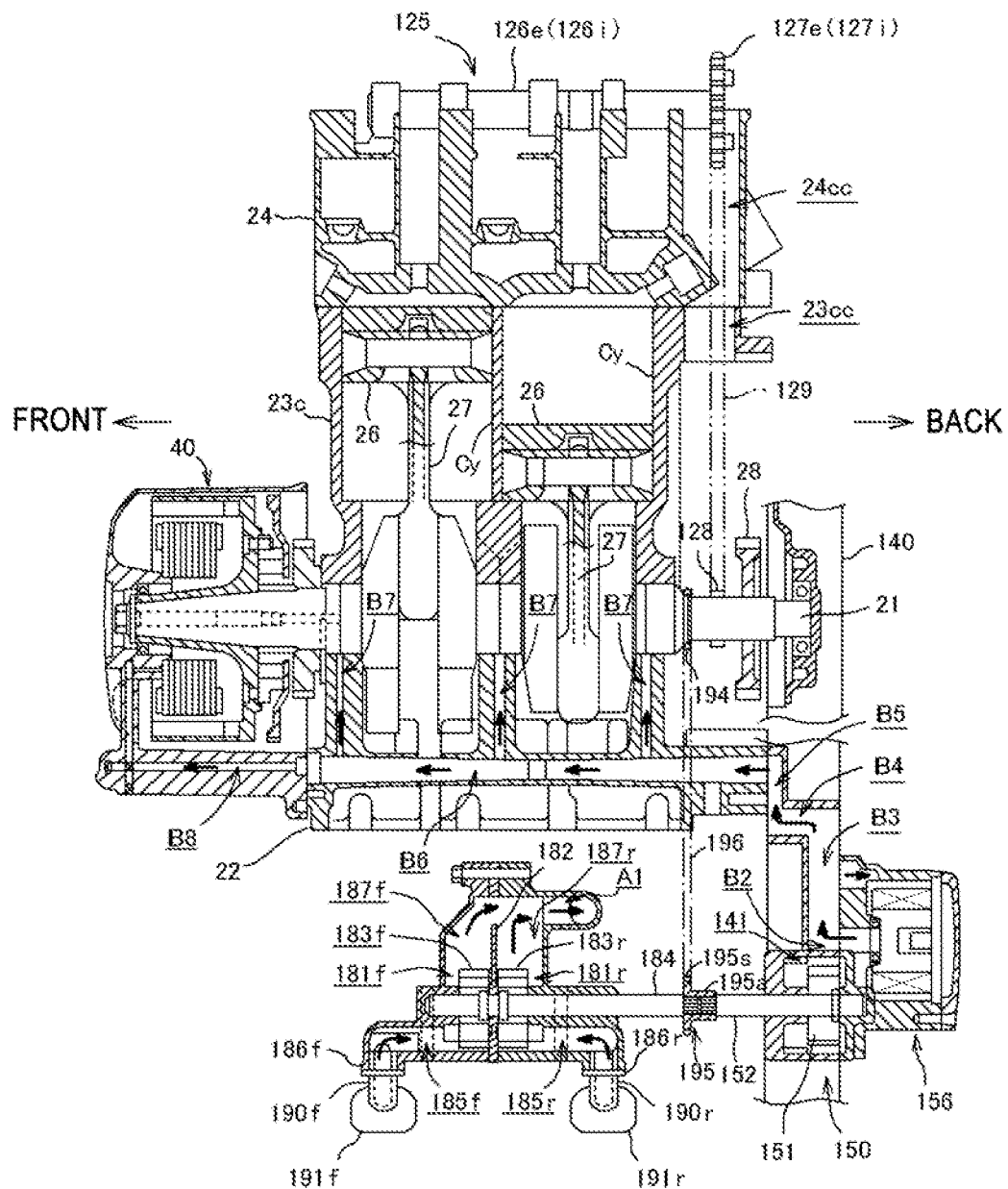
FIG. 15 is illustrates a lubricant structure.

With reference to FIG. 15, cam chain chambers 24cc and 23cc are formed along a back side wall of the cylinder portion 23c of the upper crankcase 23 and the cylinder head 24. Driven sprockets 127i and 127e, which are respectively fitted to back ends of the intake camshaft 126i and the exhaust camshaft 126e and directed in the front and back direction, face the cam chain chambers 24cc and 23cc. A cam chain 129 installed in the cam chain chambers 24cc and 23cc is wrapped around a drive sprocket 128 fitted near a back end of the crankshaft 21 and around the driven sprockets 127i and 127e.

Accordingly, the rotation of the crankshaft 21 is transferred to the intake camshaft 126i and the exhaust camshaft 126e via the cam chain 129, and the intake valve 123i and the exhaust valve 123e slide at a predetermined timing by the rotation of the intake camshaft 126i and the exhaust camshaft 126e to open the valves. An AC generator 40 is provided on the front end where the crankcases 22 and 23 of the crankshaft 21 protrude forward (see FIG. 15).

Figure 14:
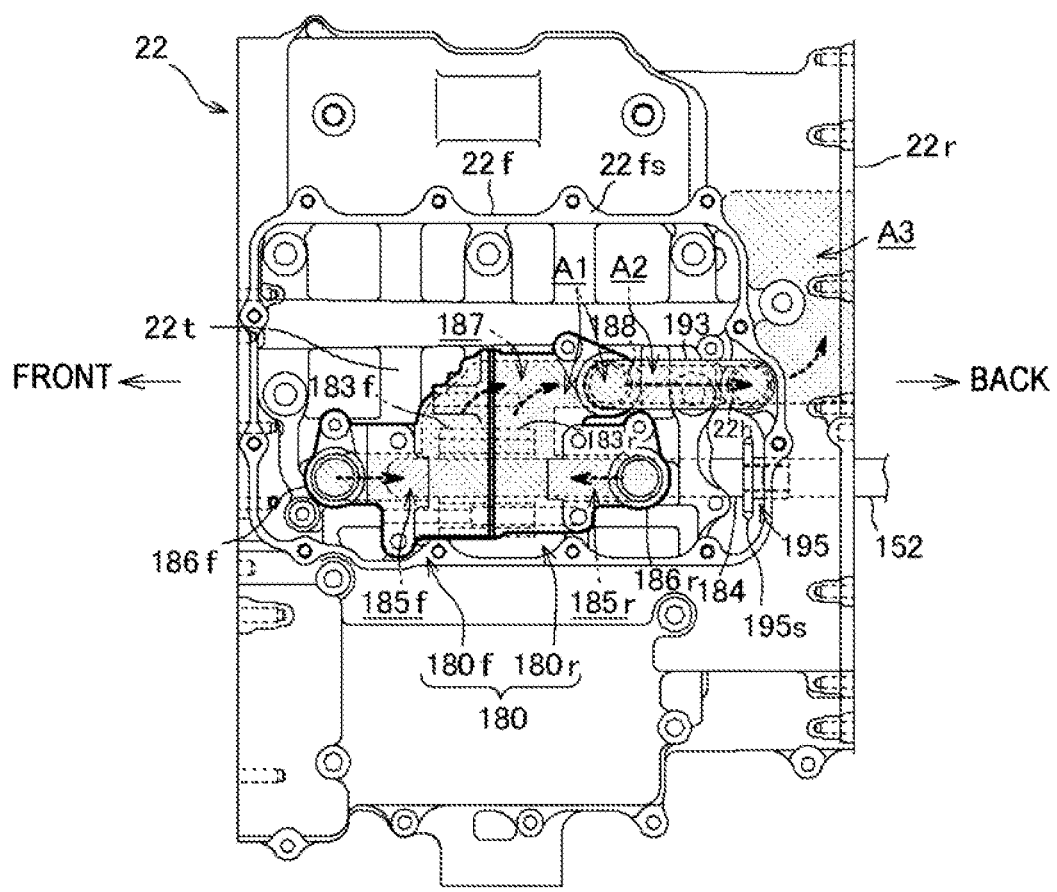
FIG. 14 is a bottom view of a crankcase of the power unit.

With reference to FIG. 7 and FIG. 14, on a side of the lower crankcase 22 where the dividing surface S with the upper crankcase 23 is inclined, the lower crankcase 22 protrudes where the lower end is constrained into a rectangular frame wall 22f. An open end surface 22fs of the rectangular frame wall 22f, which is parallel to the dividing surface S, is therefore inclined. An oil pan 130 is attached from below to the open end surface 22fs of the rectangular frame wall 22f of the lower end of the lower crankcase 22 so as to cover the opening of the rectangular frame wall 22f.

An oil pan 130, having an inclined rectangular open end surface that corresponds to the open end surface 22fs of the rectangular frame wall 22f, is a container for collecting oil. The oil pan 130 includes triangular front and rear vertical walls 130f and 130r where the front and rear edges of the rectangular opening make up one edge, respectively. The oil pan 130 also includes a horizontal bottom wall 130h connected between the other horizontal edges of the front and rear vertical walls 130f and 130r, and an inclined wall 130s further connected between other inclined edges of the front and rear vertical walls 130f and 130r (see FIG. 3, FIG. 4, and FIG. 7). When the oil pan 130 is attached to the inclined open end surface 22fs of the rectangular frame wall 22f of the lower end of the lower crankcase 22, the bottom wall 130h is horizontal.

A back surface of the upper crankcase 23 and lower crankcase 22 is joined by the inclined dividing surface S. As illustrated in FIG. 7, a large space is enclosed by rearward protruding rear frame walls 23r and 22r, and end surfaces of rear frame walls 23r and 22r form a continuous surface. The main shaft 31 protrudes from the back surface of the upper crankcase 23 while a balancer shaft 131 on the front of the crankshaft 21 protrudes from the back surface of the lower crankcase 22, within the rear frame walls 23r and 22r. The aforementioned primary drive gear 28, along with a drive sprocket 128 and a drive sprocket 194, are fitted to the protruding back end portion of the crankshaft 21. The twin clutch 30 is located on the protruding back end portion of the main shaft 31.

A casing member 140 is overlaid and aligned to the rear frame walls 23r and 22r of the back surfaces of the upper crankcase 23 and the lower crankcase 22 so as to abut against a vertical end surface thereof. A cover member 170 and a clutch cover 178 are further placed over the back surface of the casing member 140. The width of casing member 140 in the crankshaft direction (i.e., front and back direction) is substantially constant. The casing member 140 functions as a spacer between the crankcases 22 and 23 and the cover member 170 so as to be interposed by contacting respective facing surfaces on both sides that are orthogonal to the crankcase 21. The casing member 140 can be formed of an aluminum alloy material with favorable thermal conductivity.

A front frame wall 140s of the casing member 140 is formed on a front surface of the casing member 140. The front frame wall 140s forms a vertical end surface corresponding to the vertical end surface of the rear frame walls 23r and 22r of the back surfaces of the upper crankcase 23 and the lower crankcase 22 (see FIG. 9). The casing member 140 includes a feed pump chamber 141 in which a rotor 151 of a feed pump 150 (also referred to herein as an "oil pump") for a lubrication system is inserted and a water pump chamber 142 in which an impeller 161 for a water pump 160 of a cooling system is inserted. The casing member 140 also includes an oil chamber 143 and a clutch case portion 144.

Figure 8:
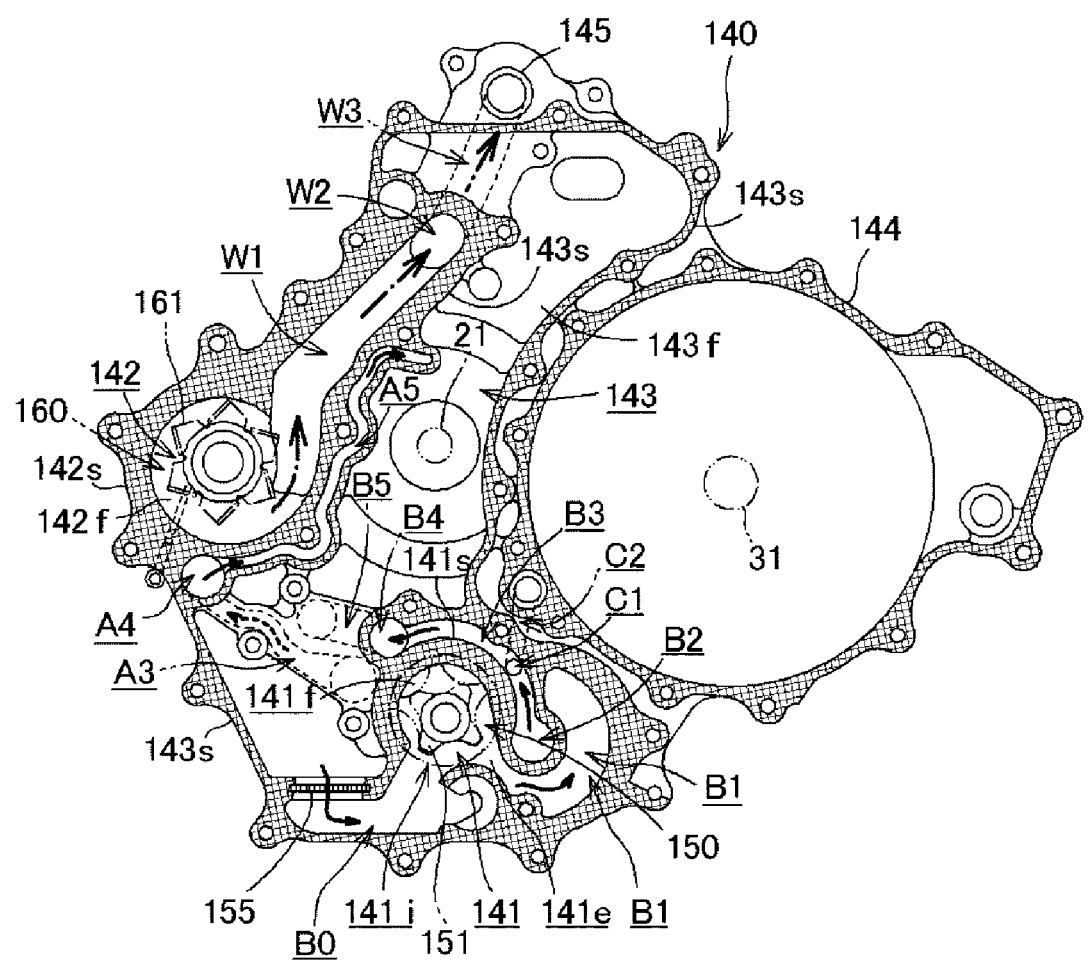
FIG. 8 is a rear view of the casing member.

The clutch case portion 144, as viewed in the crankshaft direction of FIG. 8, is substantially circular in cross section and is centered around the main shaft 31 on the right side portion of the casing member 140. A vertically long oil tank chamber 143 extends generally in the vertical direction through a position that overlaps with the crankshaft 21, when viewed in the crankshaft direction (i.e., along an axis of the crankshaft). The oil tank chamber 143 extends along the clutch case portion 144 on the left side of the clutch case portion 144.

With reference to FIG. 8, which is a rear view of the casing member 140, the water pump chamber 142 is located at substantially the same height as the crankshaft 21 to the left side of the oil tank chamber 143. The feed pump chamber 141 is located below the oil tank chamber 143 and towards the right side with respect to a lower portion of the oil tank chamber 143. The oil tank chamber 143 includes a vertically long recess having a rearward opening with the perimeter of a vertical front wall 143f enclosed by a frame wall 143s. The feed pump chamber 141 and the water pump chamber 142 also define recesses having rearward openings with perimeters of the front walls 141f and 142f enclosed by arc shaped frame walls 141s and 142s.

Accordingly, the feed pump chamber 141, the water pump chamber 142, and the oil tank chamber 143 are mutually located in substantially the same axial position with respect to the engine (i.e., with respect to the crankshaft direction) and include recesses that open rearwardly. The rearward openings included in the recesses are closed by the cover member 170.

Figure 16:
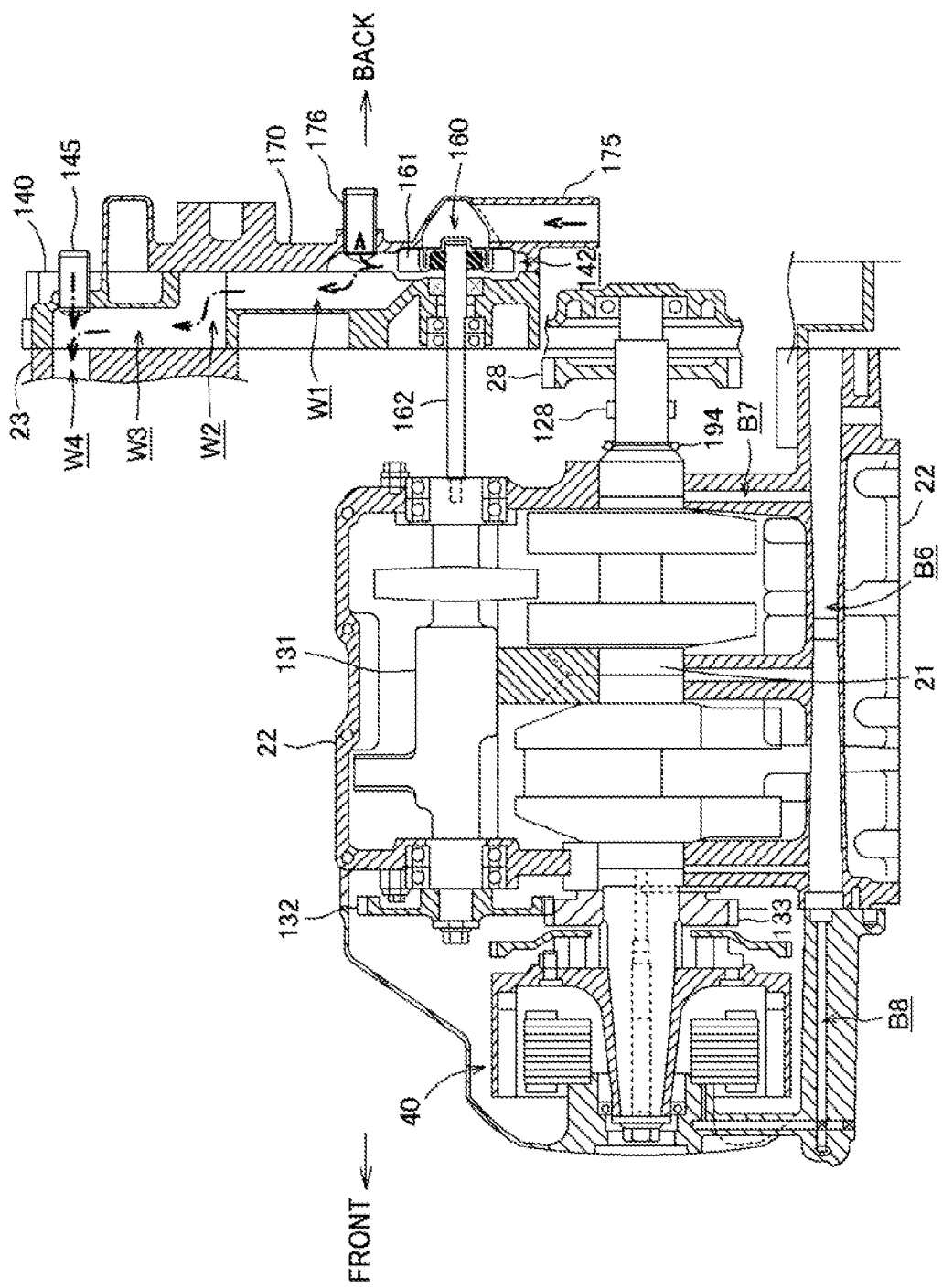
FIG. 16 is cross-sectional view of the line XVI-XVI of FIG. 6.

The feed pump (i.e., oil pump) 150 is a trochoid pump, and the rotor 151 inserted in the feed pump chamber 141 combines an inner rotor and an outer rotor. The inner rotor is integral with a feed pump shaft 152 rotatably supported and directed in the front and back direction. The impeller 161 inserted in the water pump chamber 142 is integral with a water pump shaft 162 rotatably supported and directed in the front and back direction. The water pump shaft 162 is coaxial with the balancer shaft 131 and is connected to the balancer shaft 131 to rotate together (see FIG. 16). As illustrated in FIG. 16, the balancer shaft 131 has a balancer driven gear 132 fitted to a front end portion of the balancer shaft. A balancer drive gear 133 is fitted to a front end portion of the crankshaft 21 adjacent the AC generator 40. The balancer drive gear 133 meshes with the balancer driven gear 132 so that the motive power of the crankshaft 21 is transferred to the balancer shaft 131 and the water pump shaft 162.

Figure 9:
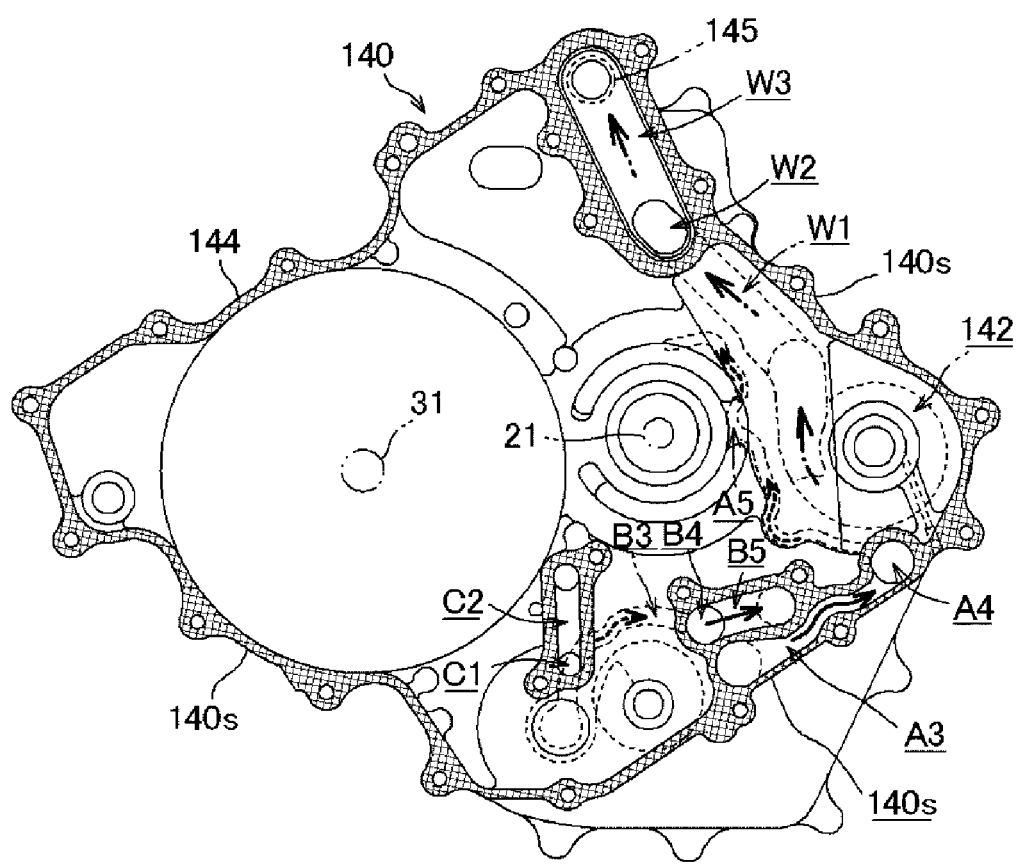
FIG. 9 is a front view of the casing member.

On a back surface of the casing member 140 (see FIG. 8), a water discharge passage W1 extends along the oil tank chamber 143 obliquely upward to the right from the water pump chamber 142. The water discharge passage W1 is partitioned from the oil tank chamber by a common frame wall 143s between the discharge passage and the oil tank chamber 143. The upper end of the water discharge passage W1 connects to a water hole W2 that passes forward. As illustrated in FIG. 9, which is a rear view of the casing member 140, a coolant passage W3 is formed on the rear face of the casing member 140 in the shape of a groove extending upwardly from the through water hole W2 (see FIG. 16).

The coolant passage W3 has an upper end located above the frame wall 143s of the oil tank chamber 143. An inflow connecting pipe 145 protrudes rearwardly from the upper end of the coolant passage W3. Further, a coolant passage W4 is formed on the cylinder portion 23c of the upper crankcase 23 to correspond to the upper end of the coolant passage W3 (see FIG. 7 and FIG. 16). Specifically, coolant from the coolant passage W3 merges with coolant that flows in from the inflow connecting pipe 145 and then flows into the coolant passage W4 of the cylinder portion 23c (see FIG. 16). The coolant passage W4 of the cylinder portion 23c communicates with the water jacket W5 of the cylinder portion 23c, and the water jacket W5 of the cylinder portion 23c communicates with the water jacket W6 of the cylinder head 24.

With reference to FIG. 8, with respect to the back surface of the casing member 140, a hole with a strainer 155 therebetween is provided on the bottom part of the oil tank chamber 143. An oil intake passage B0 below the hole extends to an intake port 141i of the feed pump chamber 141. The oil tank chamber 143 communicates with the oil intake passage B0 of the feed pump 150 via the strainer 155. An oil discharge passage B1 extends upward in an arc shape after extending obliquely downward from an exhaust port 141e of the feed pump chamber 141.

An oil filter 156 is attached to the cover member 170 on the oil discharge passage B1 such that the oil discharge passage B1 defines an inflow port of the oil filter 156. An oil outflow port B2 is formed on the cover member 170 for the oil filter 156 on a central portion of the arc-shaped oil discharge passage B1. An oil passage B3 is formed so as to circumvent the outer perimeter of the feed pump chamber 141 from the oil outflow port B2. The oil passage B3 passes through to the front by a through oil hole B4 on the left end of the oil passage B3.

As illustrated in FIG. 9, which is a rear view of the casing member 140, an oil passage B5 is formed on the back surface of the casing member 140 towards the left side (right side in FIG. 9) with respect to the through oil hole B4. A common oil passage B5 is formed on the back surface of a back side wall of the lower crankcase 22 that corresponds to the oil passage B5 of the casing member 140 (see FIG. 7). On the lower crankcase 22, a main oil passage B6 extends parallel to the crankshaft 21 from the left end of the oil passage B5 forward, and a branch oil passage B7 extends to each bearing portion of the crankshaft 21 from the main oil passage B6 (see FIG. 7 and FIG. 15). The main oil passage B6 also communicates from a front end to an oil passage B8 in a generator cover 43 of the AC generator 40 to lubricate portions of the AC generator 40 (see FIG. 15).

A through oil passage C1 branches forwardly from the oil passage B3 at an intermediate location of oil passage B3. The through oil passage C1 is perforated. An oil passage C2 extends upward from the through oil passage C1 to the back surface of the casing member 140 (see FIG. 9). Although not illustrated, the oil passage C2 can further communicate with oil passages of the cylinder portion 23c and the cylinder head 24 so that oil is supplied for lubrication of the valve mechanism 125 and the like.

Further, with reference to FIG. 9, an oil passage A3 formed on the casing member 140 extends obliquely along the front frame wall 140s below the oil passage B5 on the front surface. A common oil passage A3 is formed on the back surface of the lower crankcase 22 that corresponds to the oil passage A3 (see FIG. 7). The oil passage A3 is an oil passage that pumps oil to the oil tank chamber 143. At an upper end of the oil passage A3, with reference to FIG. 8, a through oil passage A4 passes rearwardly to connect oil passage A3 to an oil passage A5 formed on the back surface of the casing member 140 in the frame wall 143s between the water discharge passage W1 and the oil tank chamber 143. The oil passage A5 extends obliquely upward along the water discharge passage W1.

Figure 10:
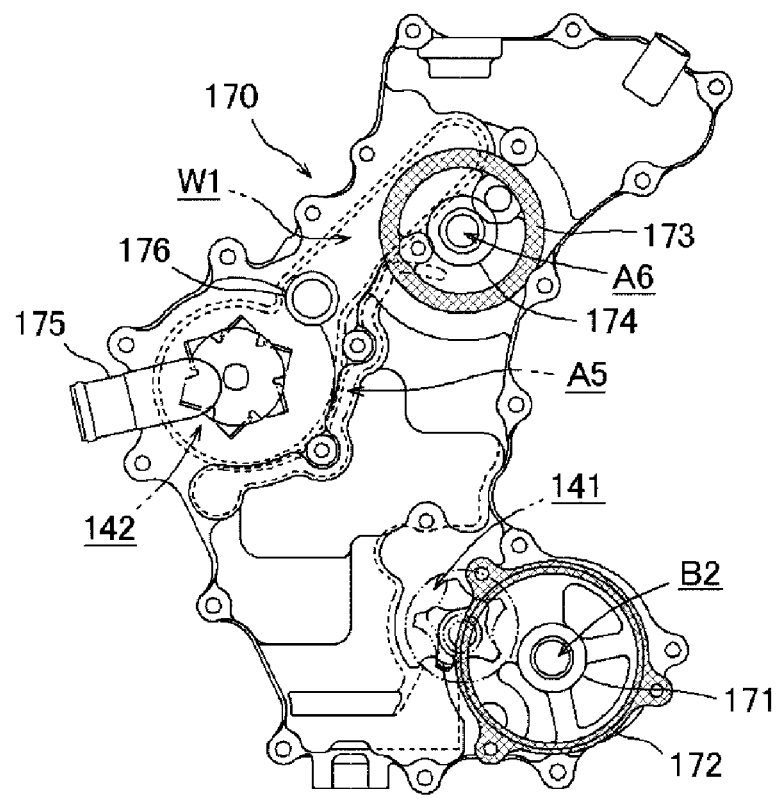
FIG. 10 is a rear view of an oil tank cover member of the power unit.
Figure 11:
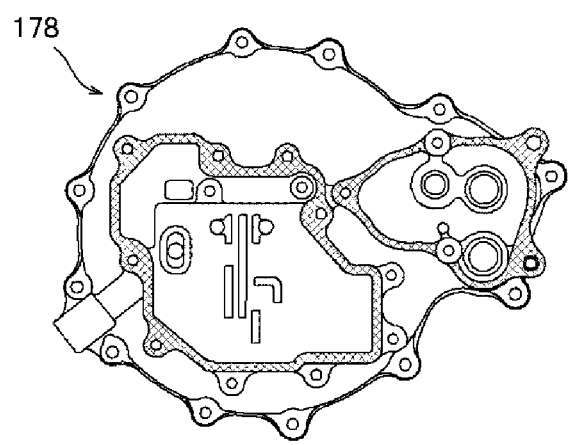
FIG. 11 is a rear view of a clutch cover member of the power unit.

The attachment of the cover member 170 on the back surface of the casing member 140 closes the rearward openings of oil tank chamber 143, feed pump chamber 141, water pump chamber 142, as well as the oil intake passage B0, the oil discharge passage B1, the oil passage B3, the oil passage A5, and the like. With reference to FIG. 10, a cylinder portion 171 on the cover member 170 defines the oil outflow port B2 with the common oil flow outflow port B2 on the back surface of the casing member 140 connected to the oil passage B3. An annular oil filter base portion 172 formed on the back surface of cover member 170 around the cylinder portion 171 for attachment of an oil filter 156.

When the oil filter 156 is attached to the oil filter base portion 172, the oil discharge passage B1 of the casing member 140 corresponds to an inflow port of the oil filter 156, and the oil discharged from the feed pump 150 flows from the oil discharge passage B1 to the oil filter 156. Oil purified by the filter element of the oil filter 156 flows out of the oil filter from the oil outflow port B2 to the oil passage B3.

Additionally, a common water discharge passage W1 and oil passage A5 are formed on the front surface of the cover member 170 to correspond respectively to the water discharge passage W1 and the oil passage A5 of the casing member 140. An annular oil cooler base portion 173 is formed on the back surface of cover member 170 for attachment to an oil cooler 200. The oil cooler base portion is located in an upper portion of the cover (see FIG. 10) that includes a rearward outlet at an upper end of the oil passage A5 formed on the inner side of cover member 170. A cylinder portion 174 formed on the cover member 170 defines an oil outflow port A6 for oil cooler 200 that passes through the cover member 170. The cylinder portion 174 is located in the center of the oil cooler base portion 173.

A water absorption connecting pipe 175 is installed in a protruding manner on a portion of the cover member 142 that corresponds to the water pump chamber 142. The water absorption connecting pipe 175 is configured so that coolant is directed into the center of the water pump 160 from the rear. An outflow connecting pipe 176 protrudes rearwardly from the cover member 170 on a portion of the cover member that corresponds to a discharge port from the water pump chamber 142.

The oil cooler 200 immerses a cooler core in a water jacket of a cylindrical case 201. When the oil cooler is attached to the oil cooler base portion 173 of cover member 170, the outlet of the upper end of oil passage A5 connects to an inflow port of the cooler core. An outflow port of the cooler core is connected to the oil outflow port A6 of cover member 170 to communicate with the oil tank chamber 143.

Figure 6:
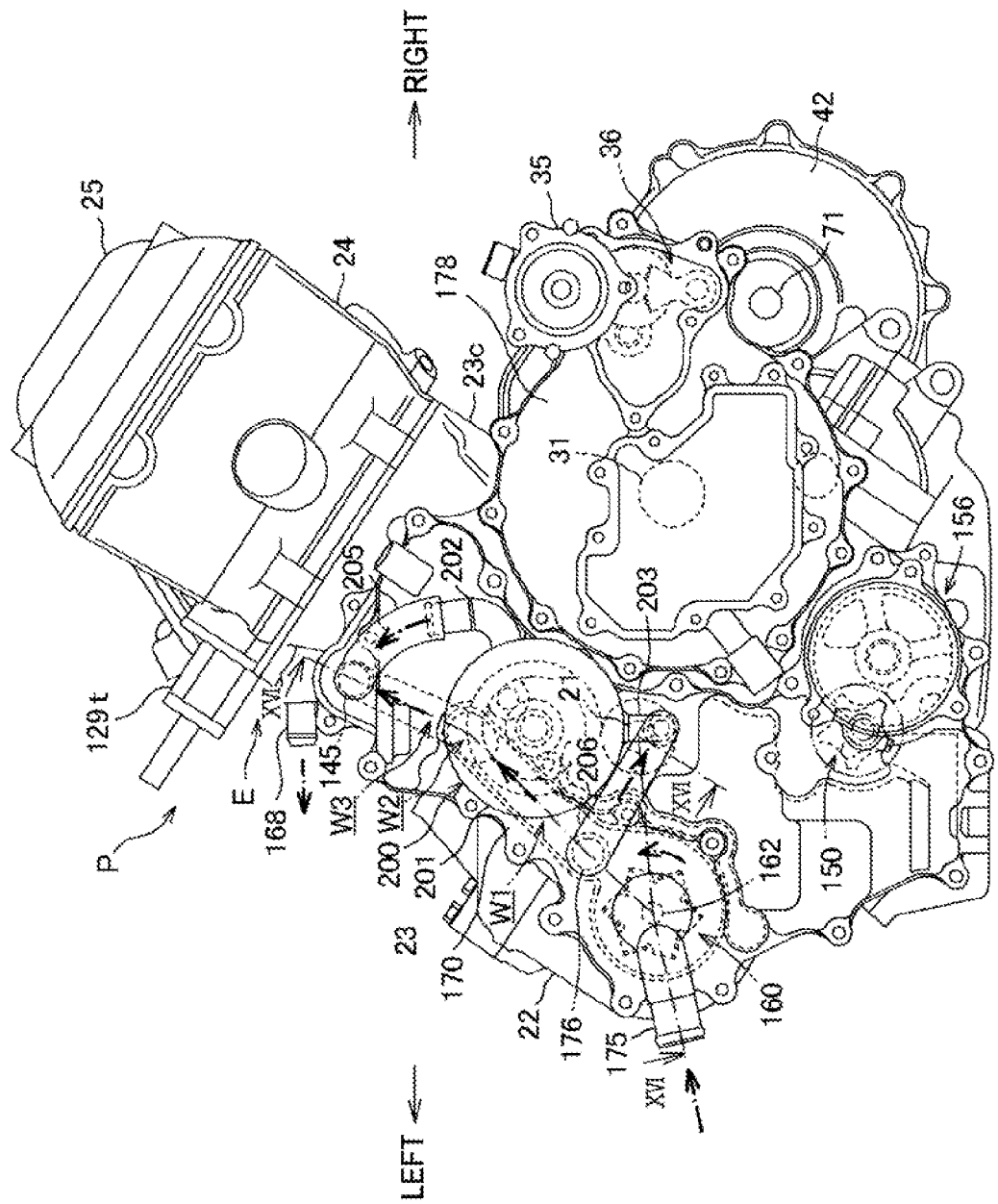
FIG. 6 is a rear view of the power unit.

As illustrated in FIG. 6, an outflow connecting pipe 202 and an inflow connecting pipe 203 for coolant extend from the cylindrical case 201 of the oil cooler 200. The outflow connecting pipe 202 extends upwardly from the oil cooler and is coupled to the inflow connecting pipe 145 of the casing member 140 by a coupling pipe 205. The inflow connecting pipe 203 extends downwardly and is coupled to the outflow connecting pipe 176 of the cover member 170 by a coupling pipe 206.

Accordingly, a portion of the coolant discharged to the water discharge passage W1 by the water pump 160 is diverted to the outflow connecting pipe 176. The diverted coolant flows through the coupling pipe 206 and enters the water jacket of the oil cooler 200 from the inflow connecting pipe 203. Coolant that has cooled oil in the cooler core flows out of the oil cooler 200 from the outflow connecting pipe 202 to the coupling pipe 205 and merges with coolant in the coolant passage W3. The coolant from coolant passage W3 flows through the inflow connecting pipe 145 into coolant passage W4 of the cylinder portion 23*c* (see FIG. 6 and FIG. 16).

In the lower crankcase 22, an inner wall 22*t* that covers the crankshaft 21 from below extends parallel to the dividing surface S at an intermediate height between the dividing surface S at an upper end and the open end surface 22*fs* of the rectangular frame wall 22*f* at a lower end (see FIG. 7 and FIG. 14). A scavenge pump 180 is attached to the lower surface of the inner wall 22*t*. The internal combustion engine E employs a dry sump lubrication system supplying the oil tank chamber 143 in which oil is pumped to the oil tank chamber 143 by the scavenge pump 180. The scavenge pump 180 includes a front scavenge pump 180*f* and a rear scavenge pump 180*r* as a pair of pumps.

FIG. 15 illustrates a cross-sectional view of the scavenge pump 180. The front and rear scavenge pumps 180*f*, 180*r* respectively include pump chambers 181*f* and 181*r* partitioned by a partition wall 182. A front rotor 183*f* and a rear rotor 183*r* that sandwich the partition wall 182 are placed back to back to each other. A scavenge pump shaft 184 is directed in the front and back direction and is rotatably supported with the ability to rotate in common with the inner rotors of both rotors 183*f* and 183*r*. The scavenge pump shaft 184 protrudes rearwardly.

With reference to FIGS. 12 to 15, front and rear intake ports 185*f* and 185*r* of the scavenge pump 180 extend from the bottom portion of the pump chambers 181*f* and 181*r* and the end portions of the intake ports 185*f* and 185*r* curve downward to form connecting ports 186*f* and 186*r*. Discharge ports 187*f* and 187*r* of the scavenge pump 180 extend to the left side and curve from an upper portion of the pump chambers 181*f* and 181*r*. The discharge ports 187*f* and 187*r* converge into one, having no partition wall 182 downstream, to become the oil discharge passage A1. The oil discharge passage A1, which extends rearwardly, forms a connecting port 188 by curving downwardly.

Pumping tubes 190*f* and 190*r* of the scavenge pump 180 are connected to the front and rear connecting ports 186*f* and 186*r* of the intake ports 185*f* and 185*r* to define the pumped oil passages A0 and A0. The lower ends of the pumping tubes 190*f* and 190*r* have end faces oriented with respect to the pumping tubes (see FIG. 7), and base plates 191*f* and 191*r* are attached to the oblique intake ports. Strainers 192*f* and 192*r* are provided midway in pumping tubes 190*f* and 190*r*.

Figure 4:
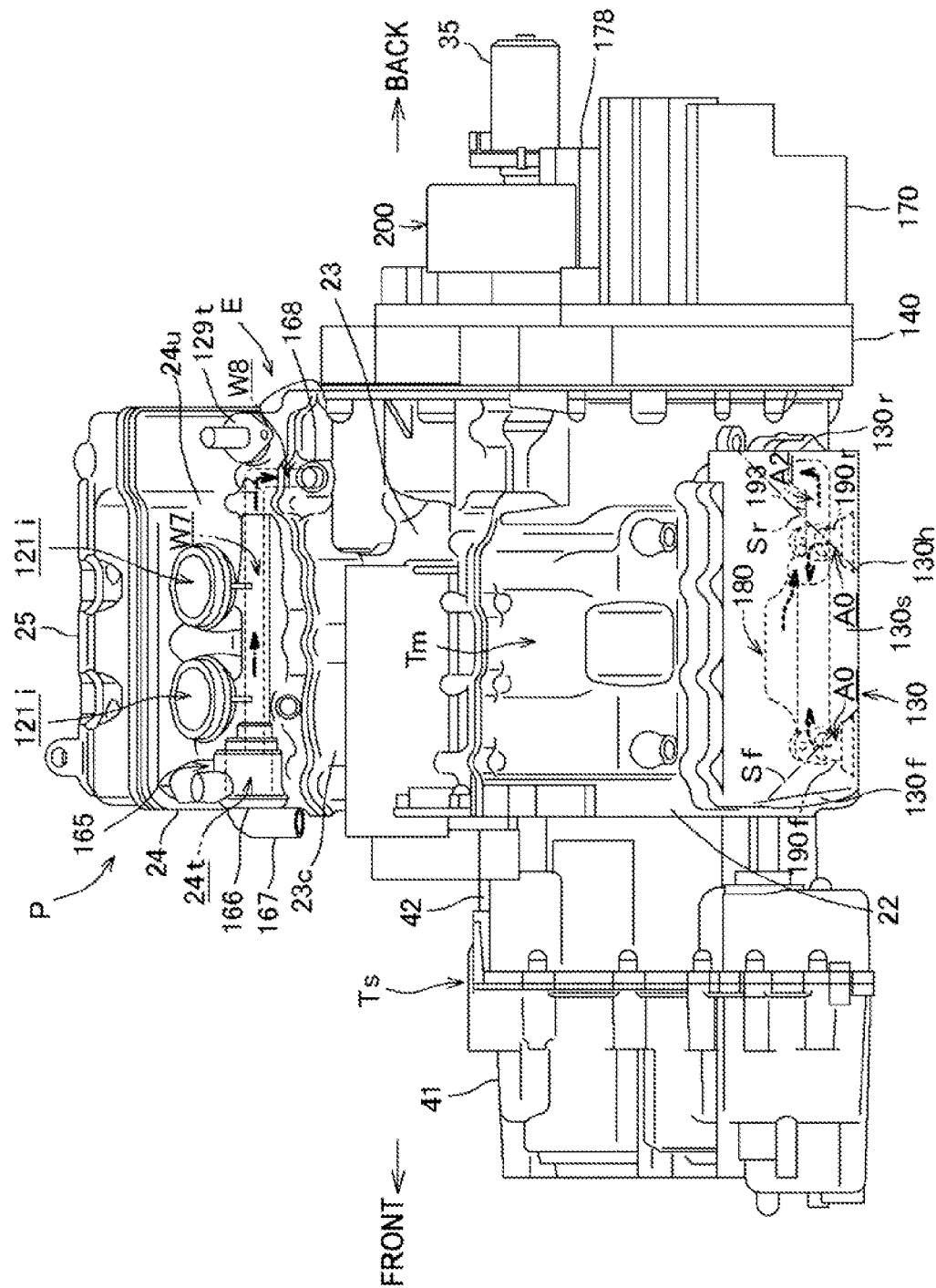
FIG. 4 is a left side view of the power unit.

Referring to FIG. 7, the scavenge pump 180 is attached to the lower surface of the inner wall 22*t* parallel to the obliquely inclined dividing surface S of the lower crankcase 22. The front and rear pumping tubes 190*f* and 190*r* protrude into the oil pan 130 obliquely downward to the left. The base plates 191*f* and 191*r* at the lower ends of the pumping tubes 190*f* and 190*r* are horizontal and are located adjacent to a horizontal bottom wall 130*h* of the oil pan 130. As illustrated in FIG. 4, the intake ports of the front and rear pumping tubes 190*f* and 190*r* are respectively placed adjacent the front and rear vertical walls 130*f* and 130*r* of the oil pan 130 so as to be mutually separated from each other.

With reference to FIG. 14 and FIG. 15, the rearwardly protruding scavenge pump shaft 184 is coaxial with a feed pump shaft 152 of the feed pump 150 included in the casing member 140. The feed pump shaft 152, which protrudes forwardly from the feed pump chamber 141 of the casing member 140, passes through an opening formed in the back side wall of the lower crankcase 22 and is adjacent to the coaxial scavenge pump shaft 184.

A minor diameter end portion 152*e* having a spline groove that decreases in diameter is included at the front end of the feed pump shaft 152. A minor diameter end portion 184*e* having a spline groove that decreases in diameter is also included at the back end of the scavenge pump shaft 184. Both minor diameter end portions 152*e* and 184*e* have equivalent major diameters. An input coupling member 195 couples the feed pump shaft 152 and the scavenge pump shaft 184.

Figure 12:
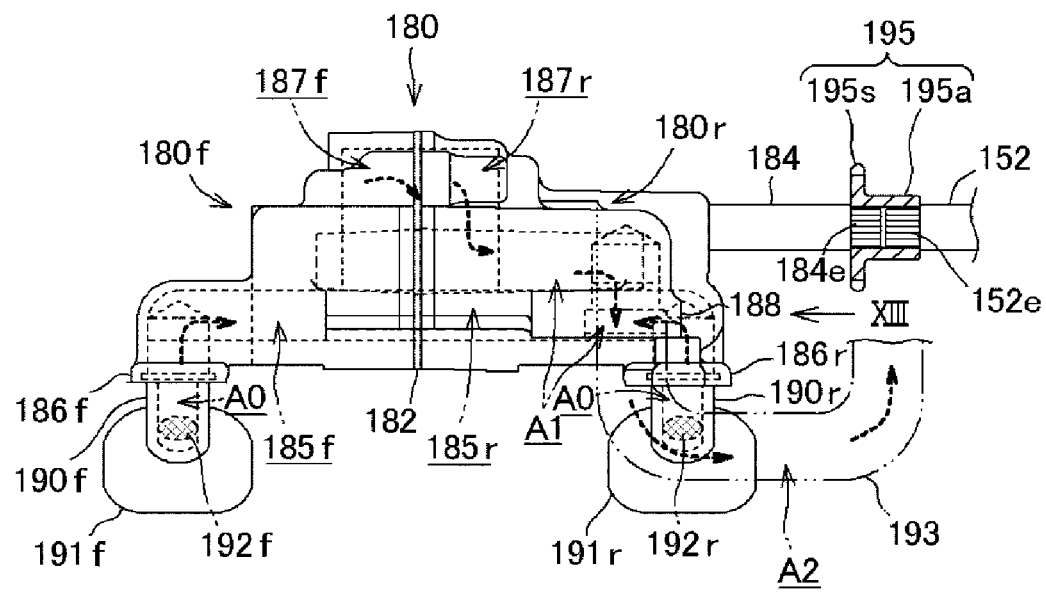
FIG. 12 is a side view of a scavenge pump of the power unit.
Figure 13:
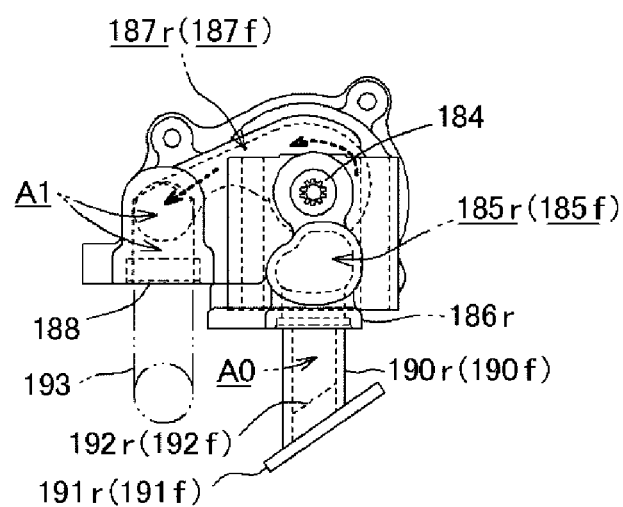
FIG. 13 is a rear view of the scavenge pump (as viewed from the arrow direction of XIII of FIG. 12).

With reference to FIG. 12, the input coupling member 195 has a cylinder portion 195*a* of a predetermined length, and a flange shaped sprocket portion 195*s* formed on an end portion thereof. Spline protrusions are formed on an inner circumferential surface of the cylinder portion 195*a* of the input coupling member 195. The minor diameter end portions 184*e*, 152*e* of the scavenge pump shaft 184 and the feed pump shaft 152 are spline fitted to the input coupling member 195 from the front and rear.

Therefore, the input coupling member 195 couples the scavenge pump shaft 184 and the feed pump shaft 152 with the ability to rotate in common. The location of the cylinder portion 195*a* of input coupling member 195 at the end portions of the scavenge pump shaft 184 and the feed pump shaft 152 positions the input coupling member 195 axially.

The scavenge pump shaft 184 is located below the crankshaft 21 and a drive sprocket 194 is mounted to a rear portion of the crankshaft 21 in the same axial position as the sprocket portion 195*s* of the input coupling member 195 (i.e., in the same position in the front and back direction) (see FIG. 7 and FIG. 15). A pump drive chain 196 is wrapped on the drive sprocket 194 of crankshaft 21 and on the sprocket portion 195*s* of input coupling member 195. Therefore, the rotation of the crankshaft 21 is transferred to the input coupling member 195 via the pump drive chain 196, and the rotation of the input coupling member 195 integrally rotates the scavenge pump shaft 184 and the feed pump shaft 152 to drive the scavenge pump 180 and the feed pump 150 simultaneously.

The oil passage A3, as described above, protrudes forwardly on the lower portion of the rear frame wall 22*r* formed on the back side wall of the lower crankcase 22 (see FIG. 7). A connecting port 22*h* opens downwardly to a portion that enters into the rectangular frame wall 22*f* of the lower wall of the oil passage A3 (see FIG. 14). A U-shaped curved coupling pipe 193 couples the connecting port 22*h* and the connecting port 188 of the oil discharge passage A1 of scavenge pump 180 to configure an oil coupling passage A2 (see FIG. 12 and FIG. 14).

The front and rear scavenge pumps 180*f* and 180*r* of scavenge pump 180 pump oil that has collected in the oil pan 130, removing impurities by middle strainers 192*f* and 192*r*, through the pumped oil passages A0 and A0 of the front and rear pumping tubes 190*f* and 190*r*.

Because the inlet ports of the front and rear pumping tubes 190*f* and 190*r* are mutually separated from each other in the oil pan 130, even if oil is disproportionately collected in one side of the oil pan 130 (e.g., if the vehicle to which the internal combustion engine E is mounted is significantly inclined to the front or rear), the scavenge pump on the lower side can easily pump the oil through the pumped oil passage A0 of the pumping tubes 190*f* and 190*r* (see FIG. 4).

FIG. 4 includes a dashed line to illustrate the lowest oil surfaces Sf and Sr where oil can be pumped when the internal combustion engine E is significantly inclined to the front or rear. FIG. 4 illustrates the oil surface Sf for when the internal combustion engine E is significantly inclined forward to approximately 45° and illustrates the oil surface Sr for when it is inclined rearward. Oil that has disproportionately collected in the front of the oil pan 130 inclined forward, even if only a little oil has collected in the oil pan 130, can be pumped by the front scavenge pump 180*f* from a suction port lower than the oil surface Sf of the pumping tube 190f. Oil that has disproportionately collected in the rear of the oil pan 130 inclined rearwardly can be pumped by the rear scavenge pump 180r from a suction port lower than the oil surface Sr of the pumping tube 190r.

In this manner, because the oil can always be pumped by whichever of the pair of scavenge pumps 180f and 180r is on a relatively lower side, even if only a little oil has collected in the oil pan 130, the volume of the oil pan 130 can be reduced and each of the pumping tubes 190f and 190r can also have a shortened length. Efficiency of oil recovery can be increased and oil capacity can be reduced. The volume of the oil pan 130 can be reduced such that the size of the overall internal combustion engine E can be reduced.

In this manner, the oil pumped through the pumped oil passage A0 by the scavenge pump 180 is discharged from the discharge ports 187f and 187r to the oil discharge passage A1, passes through the oil coupling passage A2 of the coupling pipe 193 and enters the oil passage A3 (see FIG. 14). The oil then passes through the through oil passage A4 from the oil passage A3 of casing member 140 and is directed upwardly by the oil passage A5 to flow into the oil cooler 200 (see FIG. 7, FIG. 8, and FIG. 10). The oil cooled by the oil cooler 200 flows out from the oil outflow port A6 into the oil tank chamber 143 (see FIG. 4 and FIG. 10).

As illustrated in FIG. 8, because the oil passage A5 formed between the casing member 140 and the cover member 170 extends along the water discharge passage W1, the oil flowing in the oil passage A5 is effectively cooled by the coolant that flows in the water discharge passage W1 and is then supplied to the oil tank chamber 143.

The oil collected in the oil tank chamber 143 is directed to the oil intake passage B0 via the strainer 155 on the bottom portion of the oil tank chamber 143 by the driving of the feed pump 150. The oil is discharged to the oil discharge passage B1 and passed through the oil filter 156 to flow out from the oil outflow port B2 into the oil passage B3, and passes through the main oil passage B6 from the through oil hole B4 and the oil passage B5 to circulate in various bearing parts and the like of the crankshaft 21. The oil then passes through the through oil passage C1 and the oil passage C2 to circulate in the valve mechanism 125 and the like (see FIG. 8).

Referring to FIGS. 3 and 4, the cooling system includes a thermostat chamber 24t for a thermostat 165 located near a curved inner portion that becomes the bottom side of the intake port 121i of cylinder head 24. Coolant that is circulated in the water jacket W6 of the cylinder head 24 flows out to the thermostat chamber 24t.

The forward opening thermostat chamber 24t is closed by a lid member 166. A connecting pipe 167 that communicates to the thermostat chamber 24t is equipped in a protruding manner on the lid member 166 (see FIG. 3 in FIG. 4). A radiator hose leading to a radiator (not shown) is connected to the connecting pipe 167. Further, a coolant bypass passage W7 that faces rearwardly, and parallel to the crankshaft 21, from the thermostat chamber 24t of the cylinder head 24 is formed by passing through the curved inner portion below the intake port (see FIG. 4).

The cam chain chamber 24cc is formed on the back side of the cylinder head 24, and a chain tensioner 129t that gives tension to the cam chain 129 is attached to the back end of a left side surface (upper side surface 24u) of the cylinder head 24. The coolant bypass passage W7 is perforated facing the chain tensioner 129t and curves downwardly in front of the chain tensioner 129t to communicate with a coolant bypass passage W8 of the cylinder portion 23c of the upper crankcase 22 (see FIG. 4 and FIG. 7).

Referring to FIG. 7, the coolant bypass passage W8 of the cylinder portion 23c is connected to the coolant bypass passage W7 by a mated surface with the cylinder head 24 and extends downwardly from the mated surface to open externally by curving to the left side. A bypass connecting pipe 168 is fitted to the opening. The water absorption connecting pipe 175 of the water pump 160 is coupled to the radiator and also coupled to the bypass connecting pipe 168.

Therefore, the coolant that circulates in the water jacket W5 of cylinder portion 23c and the water jacket W6 of cylinder head 24 is led to the thermostat chamber 24t. The coolant is then directed either through the radiator according to the thermostat 165 and then back to the water pump 160 or through a bypass water route that does not go through the radiator but detours and returns to the water pump 160.

In other words, when the internal combustion engine E has not warmed up, the thermostat 165 closes the water route to the radiator and opens the bypass water route to hasten engine warming. When the engine has warmed up, the thermostat 165 closes the bypass water route and opens the water route to the radiator so that coolant cooled by the radiator circulates in the water jackets W5 and W6 to cool the cylinder portion 23c and the cylinder head 24.

The casing structure of the water-cooled internal combustion engine E is described below in further detail. As described above, the oil pump chamber 141 and the water pump chamber 142 are formed together on the casing member 140 and both the oil pump chamber 141 and the water pump chamber 142 are covered by the cover member 170. As such, the oil pump 150 and the water pump 160 may be constituted by the common casing member 140 and the common cover member 170 which may reduce the number of components and improve assembly and maintainability by using members in common.

As described above, the casing member 140 also functions as a spacer sandwiched in respective contact with the cover member 170 and the crankcases 22 and 23, and the oil pump chamber 141 and the water pump chamber 142 are formed in nearly the same axial position (i.e., in the crankshaft direction). Arranged in this manner, the oil pump 150 and the water pump 160 may be installed compactly in the crankshaft direction, enabling a reduction in size of the internal combustion engine.

As illustrated in FIG. 8, the vertically long oil tank chamber 143 of the casing member 140 extends through a position that overlaps with the crankshaft 21 as viewed axially (i.e., in the crankshaft direction). The oil pump chamber 141 and the water pump chamber 142 are located on opposite sides of the oil tank chamber 143, and the oil tank chamber 143 is covered by the cover member 170. Arranged in this manner, the oil pump chamber 141, the water pump chamber 142, and the oil tank chamber 143 can be intensively placed in the periphery of the crankshaft 21 as viewed in the crankshaft direction, thereby enabling reduction in size of the internal combustion engine E. Oil stored in the oil tank chamber 143 may be easily cooled by the coolant that is circulated by the water pump 160, thereby increasing cooling efficiency of the internal combustion engine E.

Further, when starting the internal combustion engine E, the temperature of oil can be raised using the temperature of the coolant to facilitate engine warm-up. Additionally, because the oil tank chamber 143 extends vertically, the gas-liquid separation performance of the oil is enhanced.

Referring to FIG. 8, the water discharge passage W1 of casing member 140 extends upwardly along the oil tank chamber 143 from the water pump chamber 142, and a clutch case portion 144 is formed integrally on a side opposite the water discharge passage W1 sandwiching the oil tank chamber 143. As a result, the water discharge passage W1 that guides the coolant from the water pump 160 to the upward cylinder 23c and the cylinder head 24 may be formed without interference by the clutch case portion 144 to thereby simplify the piping structure. Further, because the clutch case portion 144 is formed integrally on the casing member 140, it is possible to improve assembly and maintainability by reducing the number of components.

Referring to FIG. 8, the oil passage A5 for of casing member 140 supplying oil to the oil tank chamber 143 is formed along the water discharge passage W1 between the water discharge passage W1 and the oil tank chamber 143. As a result, the oil that flows in the oil passage A5 is effectively cooled by the coolant flowing in the water discharge passage W1 and is supplied to the oil tank chamber 143 to thereby improve the cooling efficiency of the internal combustion engine E.

Referring to FIG. 10, the oil filter base portion and the oil cooler base portion 173 are both included on the cover 170. As a result, the structure may be simplified and assembly and maintainability may be improved by combined use of different members.

Referring to FIG. 8 and FIG. 10, the oil filter base portion 172 is located near a lower side of the oil pump chamber 141 and the oil cooler base portion 173 is located in a position that corresponds to an upper side portion of the oil tank chamber 143. As a result, the oil cooler 200 and the oil filter 156 may be separately placed above and below the cover member 170 and size increase of the internal combustion engine E due to space for the oil cooler 200 and the oil filter 156 may be prevented. The degree of freedom in the design of the cooling and lubrication structure is enhanced, and efficiency of cooling and lubrication performance may be improved.

As described above, the casing member 140 can be formed of an aluminum alloy material having favorable thermal conductivity. As a result, the oil circulated by the oil pump 150 can be effectively cooled by the coolant circulated by the water pump 160, thereby increasing the cooling efficiency of the internal combustion engine E. Further, when starting the internal combustion engine E, the temperature of the oil may be raised more quickly using the temperature of the coolant to further facilitate engine warm-up.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments of the invention.

What is claimed is:

1. A casing structure of a water-cooled internal combustion engine comprising:
an oil pump including a rotor inserted into an oil pump chamber formed on a casing member that covers a first end of a crankshaft supported by a crankcase; and
a water pump including an impeller inserted into a water pump chamber formed on the casing member; and
a cover member covering the oil pump chamber and the water pump chamber of the casing member.

2. The casing structure of claim 1, wherein the casing member is sandwiched between the cover member and the crankcase by respective contact at mated surfaces on both sides of the casing member orthogonal to the crankshaft, and the oil pump chamber and the water pump chamber are located with respect to the crankshaft at substantially the same axial location.

3. The casing structure of claim 1, wherein a vertically long oil tank chamber is formed on the casing member extending in a substantially vertical direction through a position that overlaps with the crankshaft when viewed in a crankshaft direction, the oil pump chamber and the water pump chamber are located on opposite sides of the oil tank chamber, and the oil tank chamber is covered by the cover member.

4. The casing structure of claim 3, wherein a coolant passage is formed on the casing member to extend upward along the oil tank chamber from the water pump chamber, and a clutch case portion that covers a perimeter of a clutch is formed integrally on the casing member on a side of the casing member opposite the coolant passage.

5. The casing structure of claim 4, wherein an oil passage for supplying oil to the oil tank chamber is formed on the casing member to extend along the coolant passage between the coolant passage and the oil tank chamber.

6. The casing structure of claim 1, wherein a base portion is included on the cover member for attachment of at least one of an oil filter and an oil cooler.

7. The casing structure of claim 6, wherein a base portion for attachment of an oil filter is located adjacent the oil pump chamber of the casing member, and a base portion for attachment of an oil cooler is located adjacent an upper portion of the oil tank chamber of the casing member.

8. The casing structure of claim 1, wherein the casing member is formed of an aluminum alloy material.

9. A casing structure of a water-cooled internal combustion engine comprising:
a casing member received on an end of a crankcase of the engine;
an oil pump chamber for an oil pump at least partially defined by the casing member, the oil pump chamber receiving a rotor of the oil pump;
a water pump chamber for a water pump at least partially defined by the casing member, the water pump chamber receiving an impeller of the water pump; and
an elongated oil tank chamber at least partially defined by the casing member, a portion of the oil tank chamber extending between the oil pump chamber and the water pump chamber.

10. The casing structure of claim 9 further comprising a cover member received on the casing member.

11. The casing structure of claim 10, wherein the casing member includes a wall that is opposite the end of the crankcase and at least one of the oil pump chamber and the water pump chamber communicates with an opening defined in the wall of the casing member, the cover member covering the opening.

12. The casing structure of claim 9, wherein the cover member includes an oil filter base portion for attaching an oil filter to the cover member and an oil cooler base portion for attaching an oil cooler to the cover member.

13. The casing structure of claim 9, wherein an oil passage communicating with the oil pump chamber is at least partially defined by the casing member.

14. The casing structure of claim 9, wherein a water passage communicating with the water pump chamber is at least partially defined by the casing member.

15. The casing structure of claim 9, wherein a clutch case covering a clutch is at least partially defined by the casing member, the clutch case having a substantially circular cross section, a portion of the oil tank chamber extending adjacent the clutch case.

16. The casing structure of claim 15, wherein the casing member at least partially defines an oil passage extending adjacent the oil tank chamber, the oil passage located opposite the clutch case with respect to the oil tank chamber.

17. A casing structure for a water-cooled internal combustion engine having a crankcase, the casing structure comprising:
   a casing member located at an end of the crankcase;
   an oil pump chamber including an oil pump chamber recess defined by at least one side wall of the casing member and an oil pump chamber front wall of the casing member, the oil pump chamber front wall located opposite the crankshaft end, the crankcase end enclosing the oil pump chamber recess to define the oil pump chamber with the casing member; and
   a water pump chamber including a water pump chamber recess defined by at least one side wall of the casing member and a water pump chamber front wall of the casing member, the water pump chamber front wall located opposite the crankcase end, the crankcase end enclosing the water pump chamber recess to define the water pump chamber with the casing member.

18. The casing structure of claim 17 further comprising a cover, the casing member located between the cover and the end of the crankcase, at least one of the oil pump chamber front wall and the water pump chamber front wall defining an opening that is covered by the cover.

19. The casing structure of claim 17 further comprising an oil tank chamber including an oil tank chamber recess defined by at least one side wall of the casing member and an oil tank chamber front wall of the casing member, the oil tank chamber front wall located opposite the crankcase end, the crankcase end enclosing the oil tank chamber recess to define the oil tank chamber with the casing member, a portion of the oil tank chamber located between the oil pump chamber and the water pump chamber.

\* \* \* \* \*